United States Patent
Wu et al.

(10) Patent No.: US 12,334,114 B2
(45) Date of Patent: Jun. 17, 2025

(54) VIDEO EDITING METHOD AND ELECTRONIC DEVICE

(71) Applicant: Honor Device Co., Ltd., Shenzhen (CN)

(72) Inventors: Menghan Wu, Shenzhen (CN); Jiandong Zhou, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/250,169

(22) PCT Filed: Aug. 25, 2022

(86) PCT No.: PCT/CN2022/114891
§ 371 (c)(1),
(2) Date: Apr. 21, 2023

(87) PCT Pub. No.: WO2023/071482
PCT Pub. Date: May 4, 2023

(65) Prior Publication Data
US 2025/0078871 A1    Mar. 6, 2025

(30) Foreign Application Priority Data
Oct. 29, 2021    (CN) .......................... 202111276128.7

(51) Int. Cl.
*G11B 27/031*    (2006.01)

(52) U.S. Cl.
CPC .................................. *G11B 27/031* (2013.01)

(58) Field of Classification Search
CPC ................................................... G11B 27/031
USPC ......................................................... 386/278
See application file for complete search history.

(56) References Cited

U.S. PATENT DOCUMENTS

| | | | |
|---|---|---|---|
| 7,969,444 B1 * | 6/2011 | Biermann | G06T 15/04 345/545 |
| 8,934,125 B2 * | 1/2015 | Fallon | G06F 3/126 358/1.15 |
| 9,679,348 B2 * | 6/2017 | Smithers | G06T 1/60 |
| 10,182,241 B2 | 1/2019 | Li et al. | |
| 10,277,771 B1 | 4/2019 | Haynold | |
| 10,388,063 B2 * | 8/2019 | Fuller | G06T 15/80 |
| 10,991,065 B2 * | 4/2021 | Jin | G06T 1/20 |
| 2004/0189671 A1 * | 9/2004 | Masne | G06T 17/00 345/619 |

(Continued)

FOREIGN PATENT DOCUMENTS

| | | |
|---|---|---|
| CN | 106791858 A | 5/2017 |
| CN | 107277616 A | 10/2017 |

(Continued)

*Primary Examiner* — Helen Shibru
(74) *Attorney, Agent, or Firm* — Rimon PC

(57) ABSTRACT

Embodiments of this application provide a video editing method and an electronic device. When an image processor of the electronic device does not support to output a video with a bit depth of 10 bits by using an existing output function, an electronic device implementing the video editing method may edit the video with the bit depth of 10 bits based on an editing operation selected by a user, and output the video with the bit depth of 10 bits by using an existing function of outputting a video with a bit depth of 8 bits.

20 Claims, 23 Drawing Sheets

(56) References Cited

U.S. PATENT DOCUMENTS

| | | | |
|---|---|---|---|
| 2014/0133832 A1* | 5/2014 | Sumler | H04N 21/84 386/278 |
| 2016/0155473 A1* | 6/2016 | Kim | G11B 27/36 386/278 |
| 2016/0261885 A1 | 9/2016 | Li et al. | |
| 2024/0155236 A1* | 5/2024 | Cui | H04N 23/951 |
| 2024/0161356 A1* | 5/2024 | Vaidyanathan | G06T 1/20 |

FOREIGN PATENT DOCUMENTS

| | | |
|---|---|---|
| CN | 108337516 A | 7/2018 |
| CN | 108769677 A | 11/2018 |
| CN | 109600618 A | 4/2019 |
| CN | 110933416 A | 3/2020 |
| CN | 111083516 A | 4/2020 |
| CN | 112087637 A | 12/2020 |
| CN | 112235571 A | 1/2021 |
| CN | 113489930 A | 10/2021 |
| CN | 114173189 A | 3/2022 |
| WO | 2015131330 A1 | 9/2015 |

* cited by examiner

Directly use readpixel() for outputting
A color value is multiplied by 255 when being converted from a float type to int:

For a 10-bit video,
a color value needs to be multiplied by 1023 when being converted from a float type to int:

VIDEO EDITING METHOD AND ELECTRONIC DEVICE

CROSS-REFERENCE TO RELATED APPLICATIONS

This application is a national stage of International Application No. PCT/CN2022/114891, filed on Aug. 25, 2022, which claims priority to Chinese Patent Application No. 202111276128.7, filed on Oct. 29, 2021. The disclosures of both of the aforementioned applications are hereby incorporated by reference in their entireties.

TECHNICAL FIELD

This application relates to the terminal field, and in particular, to a video editing method and an electronic device.

BACKGROUND

As a photographing technology and an image processing technology develop, intelligent terminals such as a mobile phone and a tablet computer may support to capture higher-quality image content such as a picture and a video, for example, an HDR video in a format such as HDR10, Dolby Vision, HLG, or TechniColor HDR.

An HDR video image supports a richer color and a more vivid and natural detail representation, bringing a better visual experience to a user. However, most intelligent terminals do not support to directly perform an image operation on the HDR video, and the HDR video needs to be converted into a low-quality SDR video. Therefore, a video obtained after an image editing operation is performed is a low-quality SDR video. Consequently, use experience of the user is reduced.

SUMMARY

This application provides a video editing method and an electronic device. When an image processor does not support to output a video with a bit depth of 10 bits by using an existing output function, the electronic device may implement the video editing method to implement a function of outputting the video with the bit depth of 10 bits, to provide a user with a service of editing and saving the video with the bit depth of 10 bits, without reducing quality of the edited video with the bit depth of 10 bits.

According to a first aspect, an embodiment of this application provides a video editing method. The method includes: detecting a first editing operation performed on a first video, where the first editing operation is used to edit the first video, a color value of a color channel of a pixel in a first video frame of the first video is a first color value, the first color value is integral data, a bit depth of the first color value is a first bit depth, and the first video frame is any video frame of the first video; generating a second color value based on the first color value in response to the first editing operation, where the second color value is floating-point data; generating N third color values based on the second color value, where the N third color values are floating-point data, a bit depth of the N third color values is a second bit depth, and N is a positive integer greater than 1; generating a fourth color value based on the N third color values, where a bit depth of the fourth color value is the first bit depth, and the fourth color value is integral data; generating a second video frame based on the fourth color value; and generating a second video based on the second video frame.

By implementing the method provided in the first aspect, in a process of editing and saving a 10-bit (namely, the first bit depth) video, an electronic device may split one floating-point number stored on one color channel of one pixel in the video frame into two floating-point numbers. An integral number including corresponding integers of the two floating-point numbers is the same as an integral number of one corresponding floating-point color. In this way, after a value that is of each color channel and that is obtained after splitting is output in an existing manner of outputting an 8-bit (namely, the second bit depth) video frame, the electronic device may output a 10-bit video frame only by determining a value of one color channel based on a 10-bit format, to obtain an edited 10-bit video. Therefore, the electronic device may provide a user with a service of editing and saving the 10-bit video.

With reference to the embodiment provided in the first aspect, in some embodiments, the generating N third color values based on the second color value includes: determining a sixth color value corresponding to the second color value, where a bit depth of the sixth color value is the first bit depth, and the sixth color value is integral data; splitting the sixth color value into N pieces of integral data with the second bit depth in a unit of the second bit depth; and determining the N third color values based on the N pieces of integral data with the second bit depth.

In this way, when splitting one floating-point number into two floating-point numbers, the electronic device may first determine an integral number corresponding to the one floating-point number, and then split the integral number into two integral numbers based on higher 8 bits and lower 8 bits. Floating-point numbers corresponding to the two integral numbers obtained after splitting are the two floating-point numbers.

With reference to the embodiment provided in the first aspect, in some embodiments, an electronic device includes a graphics processing unit GPU, an encoder, and a first memory, and the generating a fourth color value based on the N third color values includes: The GPU writes the N third color values into the first memory, to obtain N fifth color values, where the N fifth color values are integral data; and the encoder reads the N fifth color values from the first memory based on the first bit depth, to obtain the fourth color value.

Therefore, after the GPU of the electronic device outputs an 8-bit (the second bit depth) third color value to a surface (the first memory), the surface may determine one color value based on 10 bits (the first bit depth), in other words, determine two third color values as one color value, so that the encoder may identify a color value of one color channel based on 10 bits.

With reference to the embodiment provided in the first aspect, in some embodiments, before the GPU writes the N third color values into the first memory, the method further includes: setting, to the first bit depth, a bit depth of a video frame carried in the first memory.

In this way, the electronic device may set a bit depth of the first memory (namely, the surface) to 10 bits. In this case, when the GPU outputs the video frame based on 8 bits, the surface may identify two consecutive pieces of 8-bit data in the video as a color value of one color channel, to obtain a video frame with a bit depth of 10 bits. Further, the encoder may alternatively determine a color value of one color channel based on two pieces of 8-bit data.

With reference to the embodiment provided in the first aspect, in some embodiments, the electronic device includes a java native interface JNI, and the setting, to the first bit depth, a bit depth of a video frame carried in the first memory includes: The JNI sets, to the first bit depth, the bit depth of the video frame carried in the first memory.

In this way, the electronic device may set the bit depth of the first memory (namely, the surface) through the JNI interface.

With reference to the embodiment provided in the first aspect, in some embodiments, that the GPU writes the N third color values into the first memory includes: The JNI sends, to the GPU, a request for obtaining the N third color values; the JNI receives the N third color values sent by the GPU; and the JNI writes the N third color values into the first memory.

In this way, the electronic device may invoke the JNI to obtain an edited video frame from the GPU.

With reference to the embodiment provided in the first aspect, in some embodiments, the electronic device includes an open graphics library OpenGL, and the generating a second color value based on the first color value includes: The OpenGL normalizes the first color value, and determines a seventh color value, where the seventh color value is floating-point data; the OpenGL determines computational logic of a second editing operation; and the OpenGL processes the seventh color value based on the computational logic, to obtain the second color value.

In this way, the electronic device may determine computational logic of a pixel in a video frame based on an editing operation selected by the user, and then indicate the GPU to process each pixel based on the logic, to obtain the edited video frame.

With reference to the embodiment provided in the first aspect, in some embodiments, the second editing operation includes one or more of an editing operation of changing a quantity of video frames, an editing operation of changing a quantity of pixels in a video frame, and an editing operation of changing a color value of a pixel.

With reference to the embodiment provided in the first aspect, in some embodiments, the electronic device includes an editing application, and that the OpenGL determines computational logic of a second editing operation includes: The OpenGL obtains the second editing operation by using the editing application; and the OpenGL determines the computational logic corresponding to the second editing operation based on the second editing operation.

With reference to the embodiment provided in the first aspect, in some embodiments, the electronic device includes a decoder and the editing application, and the detecting a first editing operation performed on a first video is specifically: The editing application detects the first editing operation performed on the first video; and after the detecting a first editing operation performed on a first video, the method further includes: The editing application sends the first video to the decoder; and the decoder decodes the first video into M original video frames in response to receiving the first video, where the first video frame is any one of the M original video frames, and M is a positive integer greater than 1.

With reference to the embodiment provided in the first aspect, in some embodiments, N is equal to 2.

With reference to the embodiment provided in the first aspect, in some embodiments, the first bit depth is 10 bits, and the second bit depth is 8 bits.

With reference to the embodiment provided in the first aspect, in some embodiments, the splitting the sixth color value into N pieces of integral data with the second bit depth in a unit of the second bit depth includes: when the first bit depth is a positive integer multiple of the second bit depth, N is the positive integer; and when the first bit depth cannot be exactly divided by the second bit depth, N is a quotient obtained by rounding up a result obtained by dividing the first bit depth by the second bit depth.

In this way, when there are less than 8 bits, the electronic device may obtain an 8-bit data through higher-bit zero padding.

With reference to the embodiment provided in the first aspect, in some embodiments, the request for obtaining the N third color values carries an address of a second memory, the second memory is a memory that is applied for by the JNI and that is used to store data, and the method further includes: The GPU writes the N third color values into the second memory in response to receiving the request for obtaining the N third color values; that the JNI receives the N third color values sent by the GPU specifically includes: The second memory of the JNI receives the N third color values sent by the GPU; and that the JNI writes the N third color values into the first memory is specifically: The JNI writes, into the first memory, the N third color values stored in the second memory.

In this way, after obtaining the edited video frame from the GPU, the electronic device may store the video frame in an image buffer (namely, the second memory) applied for by the electronic device, and then input the video frame into the surface (namely, the first memory).

With reference to the embodiment provided in the first aspect, in some embodiments, the electronic device includes an open graphics library OpenGL; that the JNI sends, to the GPU, a request for obtaining the N third color values includes: The JNI sends, to the OpenGL, a first request for obtaining the N third color values; and the OpenGL sends, to the GPU, a second request for obtaining the N third color values; and that the GPU writes the N third color values into the second memory in response to receiving the request for obtaining the N third color values is specifically: That the GPU sends the N third color values to the OpenGL in response to the second request; and the OpenGL writes the N third color values into the second memory.

With reference to the embodiment provided in the first aspect, in some embodiments, after that the decoder decodes the first video into M original video frames, the method further includes: The decoder sends the M original video frames to the OpenGL; and before the OpenGL determines the computational logic of the second editing operation, the method further includes: The OpenGL sets a color encoding format of the first video frame to an RGB color format.

With reference to the embodiment provided in the first aspect, in some embodiments, the first video includes one of a high dynamic range HDR video and a LOG video.

With reference to the embodiment provided in the first aspect, in some embodiments, when the second editing operation is the editing operation of changing a quantity of video frames and/or the editing operation of changing a quantity of pixels in a video frame, the second video is an HDR video, and the second video is an HDR video; or the second video is a LOG video, and the second video is a LOG video; and when the second editing operation is the editing operation of changing a color value of a pixel, the second video is a LOG video, and the second video is an HDR video.

According to a second aspect, this application provides an electronic device. The electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method described in any one of the first aspect and the possible implementations of the first aspect.

According to a third aspect, an embodiment of this application provides a computer-readable storage medium, including instructions. When the instructions run on an electronic device, the electronic device is enabled to perform the method described in any one of the first aspect and the possible implementations of the first aspect.

According to a fourth aspect, an embodiment of this application provides a computer program product including instructions. When the computer program product runs on an electronic device, the electronic device is enabled to perform the method described in any one of the first aspect and the possible implementations of the first aspect.

It can be understood that the electronic device provided in the second aspect, the computer storage medium provided in the third aspect, and the computer program product provided in the fourth aspect are all used to perform the method provided in the first aspect of this application. Therefore, for beneficial effects that can be achieve, refer to beneficial effects in the corresponding method. Details are not described herein.

DESCRIPTION OF EMBODIMENTS

Figure 1A:
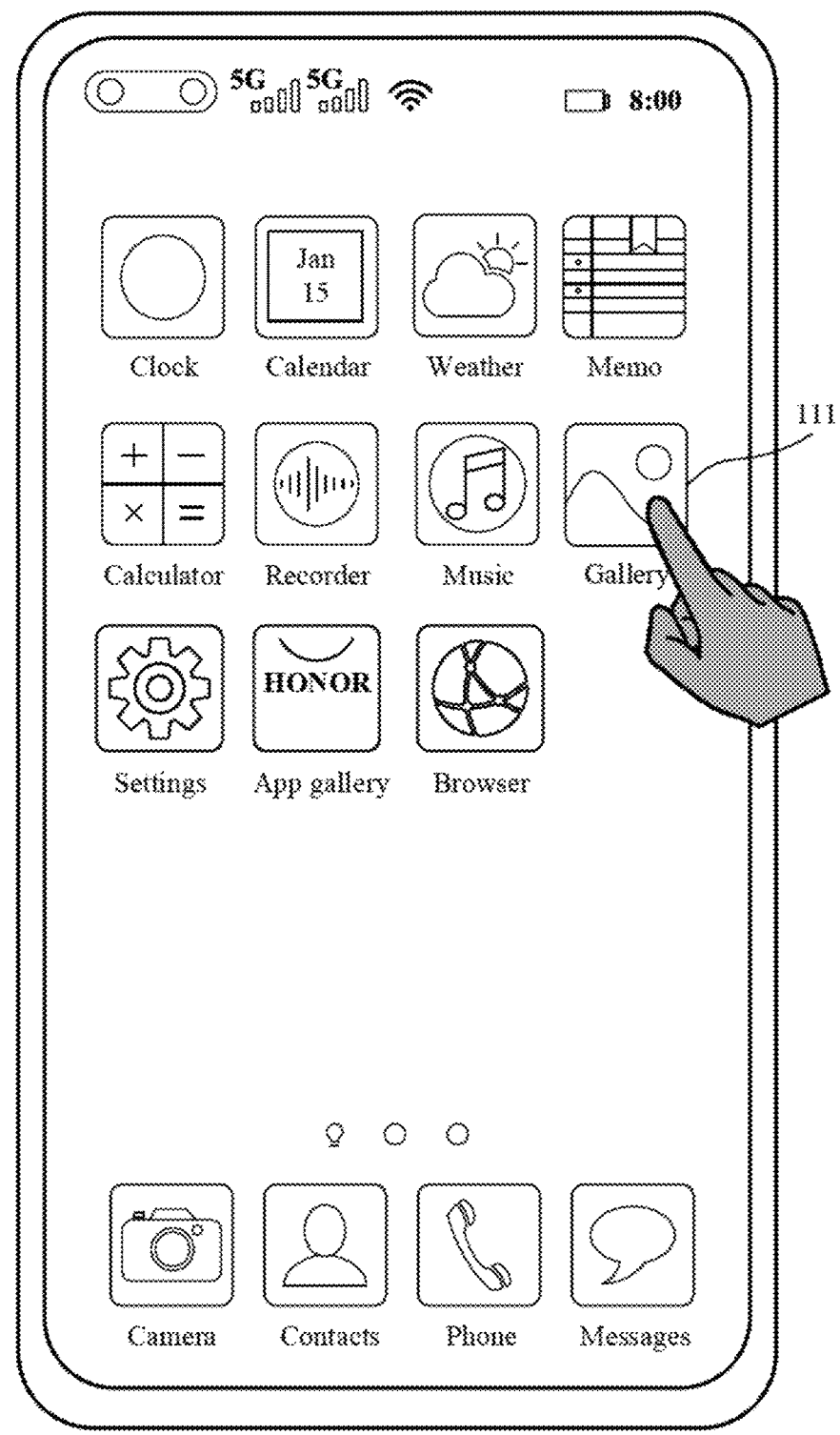
FIG. 1A to FIG. 1K are schematic diagrams of a group of user interfaces according to an embodiment of this application.

Terms used in embodiments of this application are merely intended to describe specific embodiments, but are not intended to limit this application.

As a photographing technology and an image technology develop, an electronic device such as a mobile phone and a tablet computer (referred to as an electronic device 100 below) may currently support to capture a high dynamic range (High Dynamic Range, HDR) video. Compared to a standard dynamic range (StanDard Dynamic Range, SDR) video, an HDR video image supports a richer color and a more vivid and natural detail representation, bringing a better visual experience to a user.

In most SDR videos, a bit depth representing a color is 8 bits. The bit depth is a method in which a computer records a color of a digital image by using "bit" (bit). That the bit depth is 8 bits may indicate that a quantity of bits used by the computer as a counting unit is eight, and the computer may use the 8 bits to indicate 28 (256, 0-255) colors. In the HDR video, a bit depth representing a color is 10 bits, and 210 (1024, 0-1023) colors can be used for the HDR video.

A color gamut represents a range of colors that can be displayed during video encoding. A BT2020 color gamut is used for the HDR video, and a BT709 color gamut is used for the SDR video. Compared with the SDR video, for the HDR video, more types of colors can be used, a color representation range is wider, and a display brightness range is wider. Further, the HDR video can support a richer image color presentation and a more vivid image detail presentation. Therefore, the HDR video can provide a viewing effect for the user, to improve use experience of the user.

After a video is captured, the user usually needs to perform an editing operation on the captured video, so that an edited video can better meet a personalized requirement of the user. For example, after the video is captured, the electronic device 100 may cut the captured video into a video with a shorter video length in response to a cutting operation performed by the user. The electronic device 100 may add image content of a special effect (including a filter, an animation special effect, a text, a sticker, or the like) to the captured video in response to a special effect addition operation performed by the user, so that the edited video has the corresponding image effect.

Usually, each frame of data of the video is 8-bit YUV data (a color format of video sampling). When the editing operation is performed, during editing of the video, a color format of data is converted into 8-bit RGB data. After the editing operation is performed, the electronic device 100 may directly convert video data in an 8-bit RGB format into video data in an 8-bit YUV format by using a C2D engine provided by a graphics processing unit (Graphics Processing Unit, GPU). The 8-bit YUV data format used after conversion is used as a data format used when the video is finally encoded into a film. Then, the electronic device 100 may save the edited video in a storage device. Therefore, when the user needs to browse or use the edited video, the electronic device 100 may read the edited video from the storage device.

Usually, a color bit depth of an SDR-type video is 8 bits, and a video data color format is a YUV format. After editing processing is performed, the electronic device 100 may encode and output a video in the 8-bit YUV format. Therefore, an SDR video in the 8-bit YUV format is still a video in the 8-bit YUV format after being edited.

However, usually, a bit depth of an HDR-type video is 10 bits, and a video data color format is the YUV format. Because the C2D engine provided by the GPU does not support conversion from a 10-bit RGB format to a 10-bit YUV format, and a format of a to-be-edited video is the 10-bit YUV format, if the foregoing editing method is still used, after the to-be-edited video in the 10-bit YUV format is converted into a 10-bit RGB video, the 10-bit YUV video cannot be restored by using the C2D engine. In other words, in a scenario of editing the HDR video, the electronic device 100 cannot obtain an output video the same as an input HDR video in the 10-bit YUV format by using the existing C2D engine provided by the GPU. If a bit depth of the output video changes from 10 bits to 8 bits, quality of an output edited video also decreases.

To meet a requirement of a user for editing of an HDR video and ensure quality of the original HDR video, embodiments of this application provide a video editing method and an electronic device. The method may be applied to an electronic device having an image processing capability. The electronic device (namely, an electronic device 100) is, for example, a mobile phone or a tablet computer.

By implementing the method, the electronic device 100 may support to convert the edited 10-bit YUV format into the 10-bit RGB format, and support to save an edited video as a video in the 10-bit YUV format. The video in the 10-bit YUV format includes an HDR video in a format such as HDR10, Dolby Vision, HLG, or Technicolor HDR, and further includes a 10-bit gray film (a LOG gray film) captured in a LOG mode. The editing operation includes but is not limited to cutting, flipping an image, scaling up/down, adding a text, adding a filter, adding a film leader (or a film tail or another page), adding a video watermark or a sticker, or the like.

Specifically, after receiving an operation performed on a to-be-edited video in the 10-bit YUV format, the electronic device 100 may first convert the video data in the 10-bit YUV format into video data in the 10-bit RGB format by using a capability provided by an open graphics library (Open Graphics Library, OpenGL), and render the edited video data in the 10-bit RGB format, to obtain edited video data. Further, based on an RGB-YUV conversion algorithm, the electronic device 100 may convert edited video data in the 10-bit RGB format into video data in the 10-bit YUV format. YUV data is encoded by a video encoder in an HDR video format, to generate HDR video data. Then, the electronic device 100 may save the edited video in a storage device. Therefore, when the user needs to browse or use the edited video, the electronic device 100 may read the edited video from the storage device, and display the edited video to the user for browsing and viewing.

By implementing the method, the electronic device 100 not only meets a requirement of the user for editing of a 10-bit video, but also ensures that a saved edited video is still the 10-bit video, without reducing quality of the edited video.

In addition to a mobile phone and a tablet computer, the electronic device 100 may be a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, and/or a smart city device. A graphics processing unit of the electronic device is incapable of directly editing and saving a video with a bit depth of 10 bits. A specific type of the electronic device is not limited in embodiments of this application.

FIG. 1A to FIG. 1K show an example of a group of user interfaces of an electronic device 100. The following describes, in detail below with reference to FIG. 1A to FIG. 1K, an application scenario in which a video editing method provided in an embodiment of this application is implemented.

First, FIG. 1A shows an example of a user interface, namely, a home page (home page), for presenting an installed application on an electronic device 100. As shown in FIG. 1A, one or more application icons such as a "Clock" application icon, a "Calendar" application icon, and a "Weather" application icon are displayed on the home page.

The one or more of application icons includes a "Gallery" application (referred to as "Gallery" below) icon, namely, an icon 111. The electronic device 100 may detect a user operation performed on the icon 111. The operation is, for example, a tapping operation, or a tapping and holding operation. In response to the operation, the electronic device 100 may display a user interface shown in FIG. 1B.

Figure 1B:
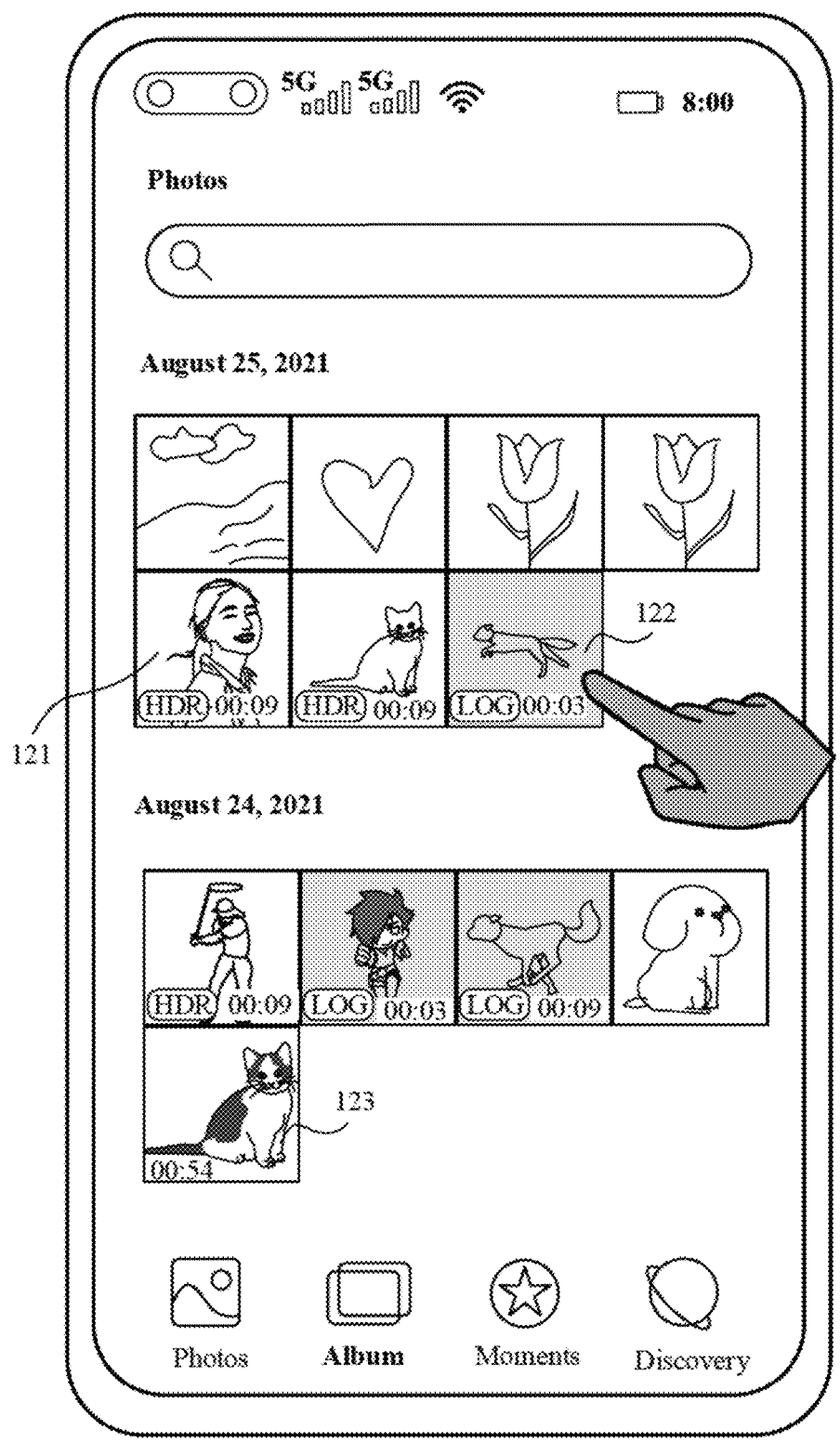

FIG. 1B shows an example of a home screen of "Gallery" when "Gallery" runs on an electronic device 100. The interface may display one or more pictures or videos. The one or more videos include an HDR video, a LOG video, and another type of video, for example, an SDR video. The LOG video is a low-saturation and low-brightness video captured in a LOG gray mode, and may also be referred to as a LOG gray film.

A bit depth of the HDR video and the LOG video is 10 bits. A bit depth of the SDR video is 8 bits.

As shown in FIG. 1B, a video indicated by an icon 121 may be an HDR video; a video indicated by an icon 122 may be a LOG video; and a video indicated by an icon 123 may be an SDR video. When the electronic device 100 displays the HDR video or the LOG video, an icon indicating the video may display a type of the video. In this case, a user may learn of the type of the video based on information displayed in the icon. For example, HDR is displayed in a lower left corner of the icon 121, and Log is displayed in a lower left corner of the icon 122.

Figure 1C:
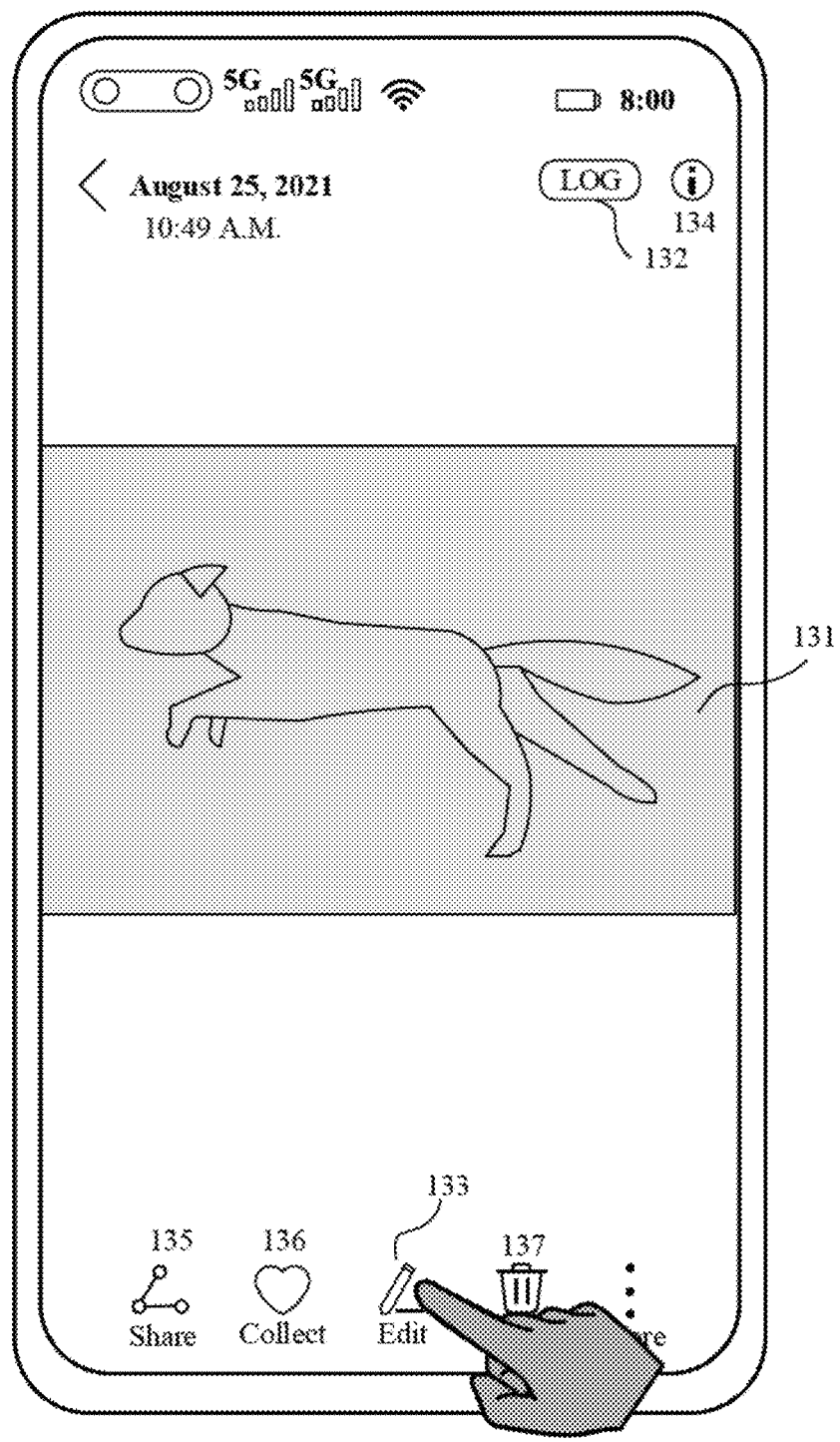

The electronic device 100 may detect a user operation performed on the icon 122. In response to the operation, the electronic device 100 may display a user interface shown in FIG. 1C. FIG. 1C shows a user interface in which an electronic device 100 specifically displays a picture or a video.

As shown in FIG. 1C, the user interface may include a window 131. The window 131 may be configured to display a picture or a video that is selected by the user for browsing. For example, in FIG. 1B, a picture or a video that is selected by the user for browsing is the LOG video ("Video A") indicated by the icon 122. Therefore, "Video A" may be displayed in the window 131.

The user interface further includes an icon 132 and a control 133. The icon 132 may be used to represent a type of a video displayed in the window 131. For example, "LOG" currently displayed in the icon 132 may indicate that "Video A" is a video of a LOG type. With reference to FIG. 1B, when the video selected by the user is an HDR video (for example, the video indicated by the icon 121 is selected), a word "HDR" may be displayed in the icon 132; and when the video selected by the user is an SDR video (for example, the video indicated by the icon 123 is selected), a word "SDR", or the like may be displayed in the icon 132.

The control 133 may be configured to: receive an operation of editing a video (or a picture) by the user, and display a user interface in which the video (or the picture) is displayed. After detecting a user operation performed on the control 133, in response to the operation, the electronic device 100 may display a user interface shown in FIG. 1D.

The user interface may further include a control 134, a Share control (135), a Collect control (136), a Delete control (137), and the like. The control 134 may be configured to display detailed information of a video, for example, a photographing time point, a photographing location, a color encoding format, a bit rate, a frame rate, and a pixel size.

The Share control (135) may be configured to send Video A to another application for use. For example, when detecting a user operation performed on the Share control, in response to the operation, the electronic device 100 may display one or more application icons. For example, the one or more application icons include an icon of social software A (for example, QQ or WeChat). After detecting an operation performed on the application icon of the social software A, in response to the operation, the electronic device 100 may send Video A to the social software A. Further, the user may share the video with a friend by using the social software.

The Collect control (136) may be configured to mark a video. In the user interface shown in FIG. 1C, after detecting a user operation performed on the Collect control, in response to the operation, the electronic device 100 may mark Video A as a favorite video of the user. The electronic device 100 may generate an album, and the album is used to display the favorite video of the user. In this case, when Video A is marked as the favorite video of the user, the user may quickly view Video A by using the album displaying the favorite video of the user.

The Delete control (137) may be used to delete Video A.

Figure 1D:
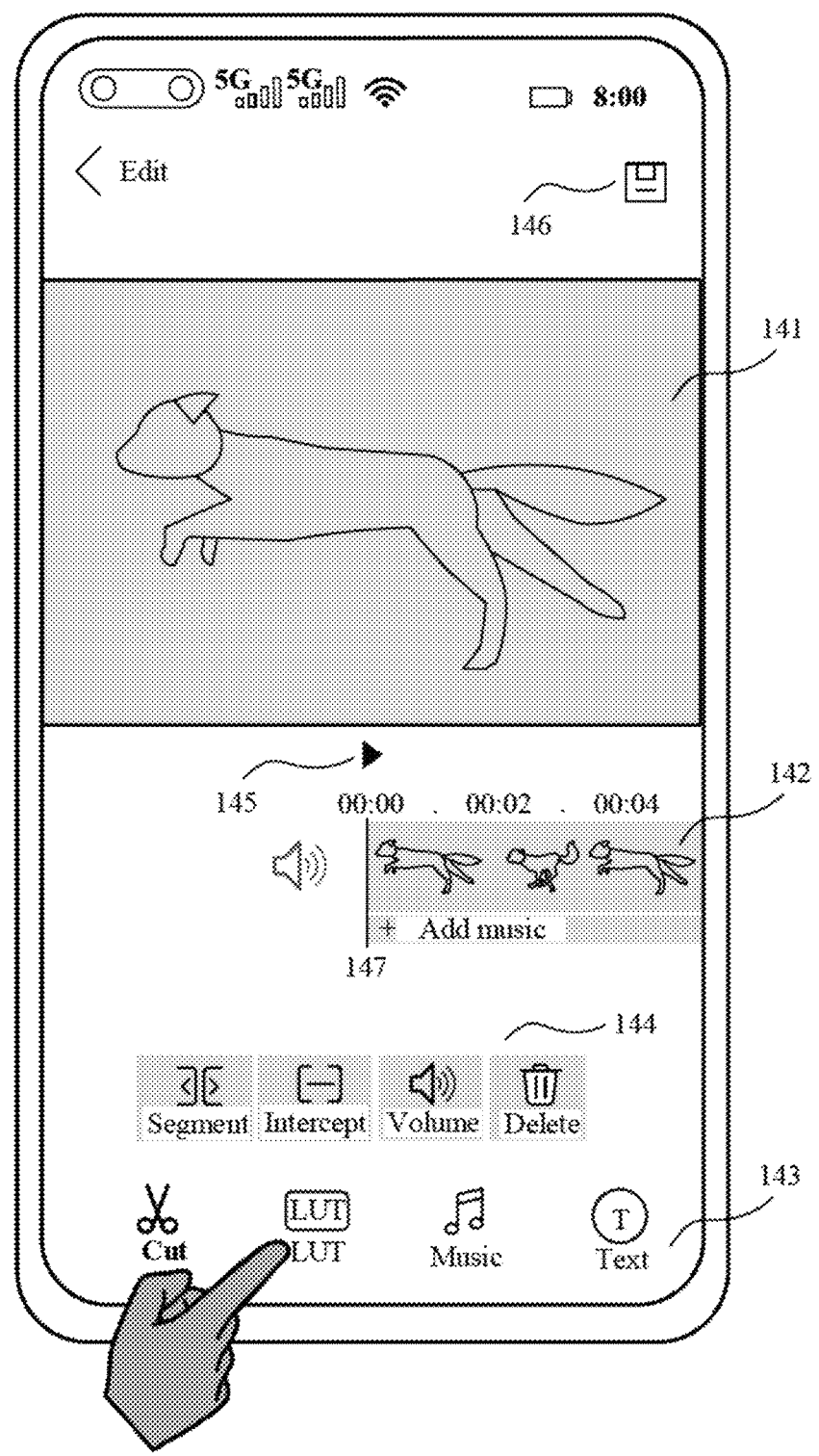

FIG. 1D shows an example of a user interface in which a user edits a video (or a picture). As shown in FIG. 1D, the user interface may include a window 141, a window 142, an action bar 143, and an action bar 144.

The window 141 may be configured to preview an edited video. Usually, the window 141 displays a cover video frame of the video. When detecting a user operation performed on the play button 145, the window 141 may sequentially display a video frame stream of the video, in other words, play the video.

The window 142 may be configured to display the video frame stream of the edited video. The user may drag the window 142 to adjust the video frame displayed in the window 141. Specifically, a scale 147 is also displayed in FIG. 1D. The electronic device 100 may detect a leftward-sliding or rightward-sliding user operation performed on the window 142. In response to the user operation, a location at which the scale 147 is located in the video frame stream is different. In this case, the electronic device 100 may display, in the window 141, a video frame at the location at which the scale 147 is currently located.

A plurality of icons of video editing operations may be displayed in the action bar 143 and the action bar 144. Usually, an icon displayed in the action bar 143 indicates an editing operation category. The action bar 144 may display, based on a currently selected operation category in the action bar 143, a video editing operation belonging to the category. For example, the action bar 143 includes "Cut". "Cut" displayed in bold may indicate that an operation currently selected by the user is "Cut". In this case, the action bar 144 displays some operations of a "Cut" type, for example, "Segment", "Intercept," "Volume", and "Delete".

The action bar 143 further includes "LUT". "LUT" is a method for adjusting an image color by using a color table lookup algorithm (look up table). A color adjustment manner may be referred to as a filter. Therefore, a "LUT" operation may be performed to provide the user with one or more filters, and is performed to adjust a color of a video image.

The user interface further includes a Save control 146. When detecting a user operation performed on the Save control 146, the electronic device 100 may save a video in a current state in response to the operation. The video in the current state may be a video on which an editing operation is performed, or a video on which no editing operation is performed. A processing procedure in which the electronic device 100 saves the video is described in detail in a subsequent embodiment. Details are not described herein.

Figure 1E:
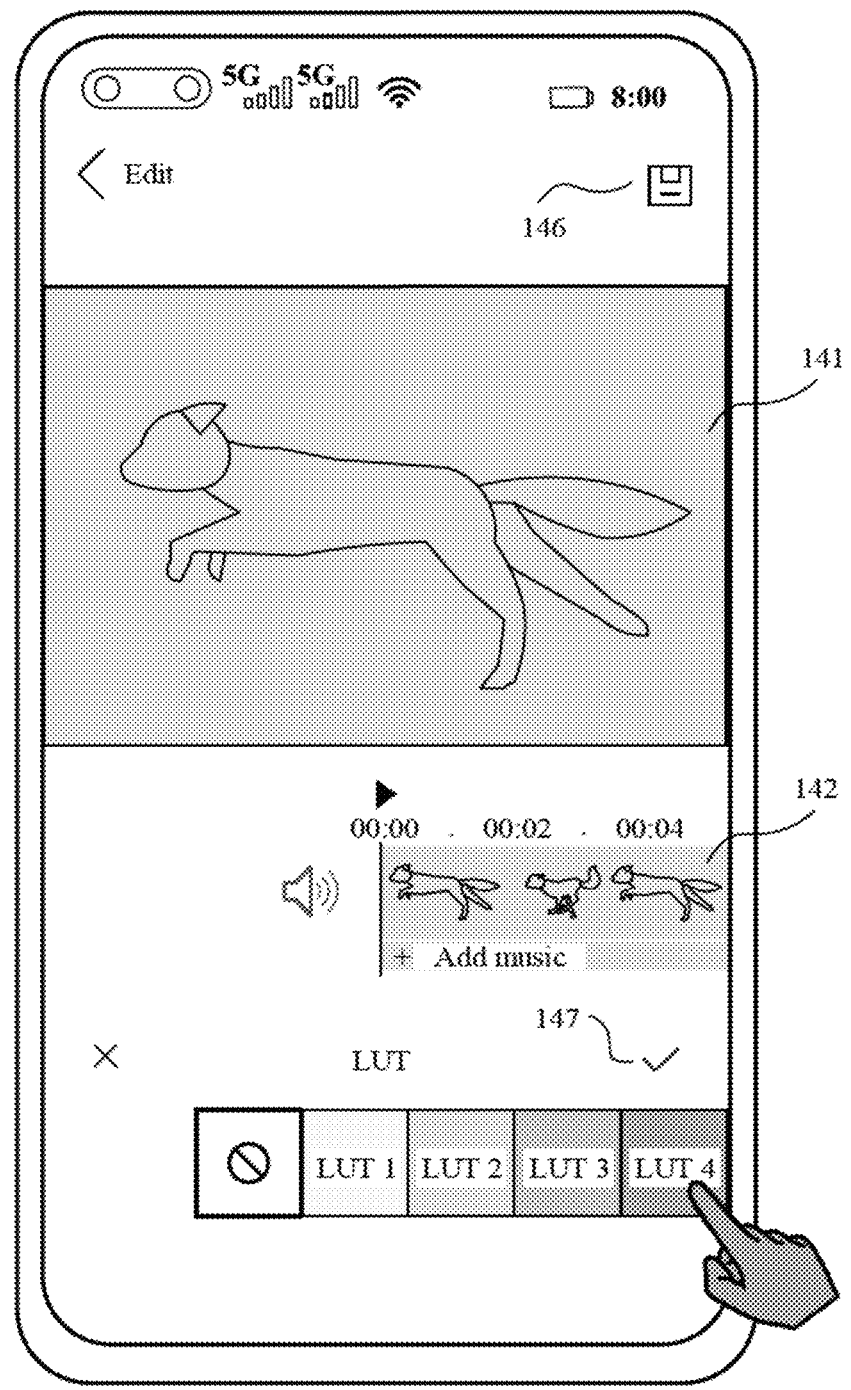

The electronic device 100 may detect a user operation performed on "LUT". In response to the operation, the electronic device 100 may display a user interface shown in FIG. 1E. FIG. 1E shows an example of a user interface in which an electronic device 100 displays a LUT filter provided to a user to adjust a color of a video image.

As shown in FIG. 1E, in this case, an image in which the video is edited may include a plurality of LUT filter controls (for example, "Null", "LUT 1", "LUT 2", "LUT 3", and "LUT 4").

First, when the user interface shown in FIG. 1E is displayed, the electronic device 100 may set a currently used LUT filter to "Null" by default. In other words, no LUT filter is added. Then, when detecting an operation performed by the user on a LUT filter control, in response to the operation, the electronic device 100 may display a user interface in which the video is edited by using a LUT filter indicated by the LUT filter control. For example, the electronic device 100 may detect a user operation performed on the filter control "LUT 4". In response to the operation, the electronic device 100 may display a user interface shown in FIG. 1F.

Figure 1F:
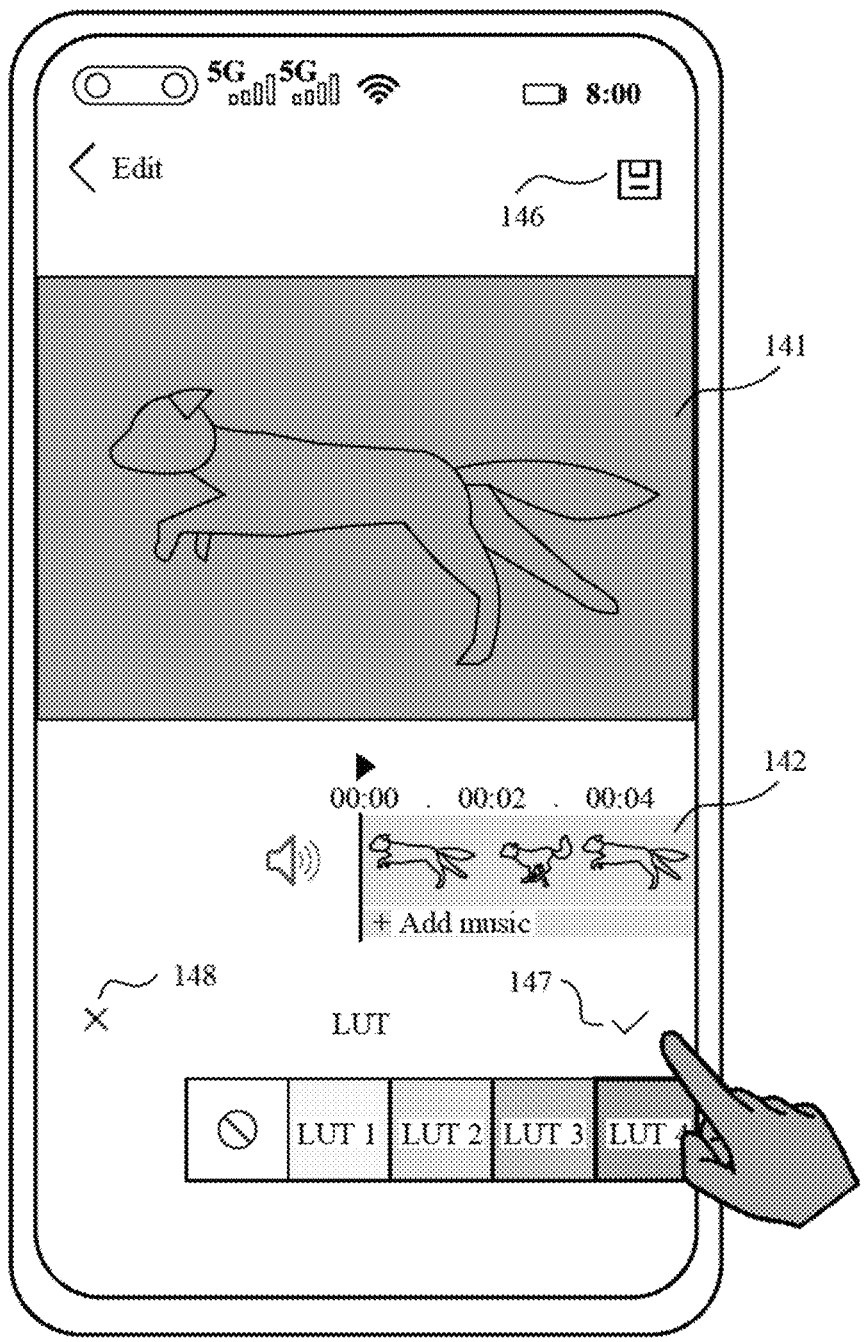

As shown in FIG. 1F, after detecting the operation performed on the filter control "LUT 4", the electronic device 100 may highlight the LUT filter control, for example, magnify the LUT filter control, make a border of the control in bold, or highlight the control. This is not limited in this embodiment of this application.

In addition, the electronic device 100 further display, in the window 141, a video obtained after rendering is performed by using a LUT filter indicated by the LUT filter control. For example, an image color of a video frame of "Video A" displayed in the window 141 in this case is different from an image color in the window 141 in FIG. 1E, and the image color of the video frame of "Video A" displayed in the window 141 in this case is the same as an image color of LUT 4. It can be understood that in this case, the electronic device 100 does not render the entire video by using the LUT filter. Usually, to save computing resources, the electronic device 100 usually renders only a video frame displayed in a current window. Alternatively, in some embodiments, the electronic device 100 may process the cover video frames by using another simple image processing means, so that a processed image has an effect of the LUT filter when being previewed.

The user interface further includes an OK control 147 and a Cancel control 148. When it is determined that a currently selected LUT filter meets a requirement of the user, the user may tap the OK control 147. When detecting the user operation, in response to the operation, the electronic device 100 may display a user interface shown in FIG. 1G. In this case, the electronic device 100 may detect the user operation performed on the Save control 146. In response to the operation, the electronic device 100 may display a user interface shown in FIG. 1H.

Certainly, when it is determined that the currently selected LUT filter does not meet the requirement of the user, the user may tap another LUT filter control, to select another LUT filter. In response to a user operation performed on any LUT filter control, the electronic device 100 may display, in the window 141, a video obtained after rendering is performed by using a LUT filter indicated by the any LUT filter control. When none of LUT filters provided by the electronic device 100 meets the requirement of the user, or when the user suspends editing of the LUT filter, the user may tap the Cancel control 148. In response to the user operation, the electronic device 100 may display the user interface shown in FIG. 1D.

Figure 1G:
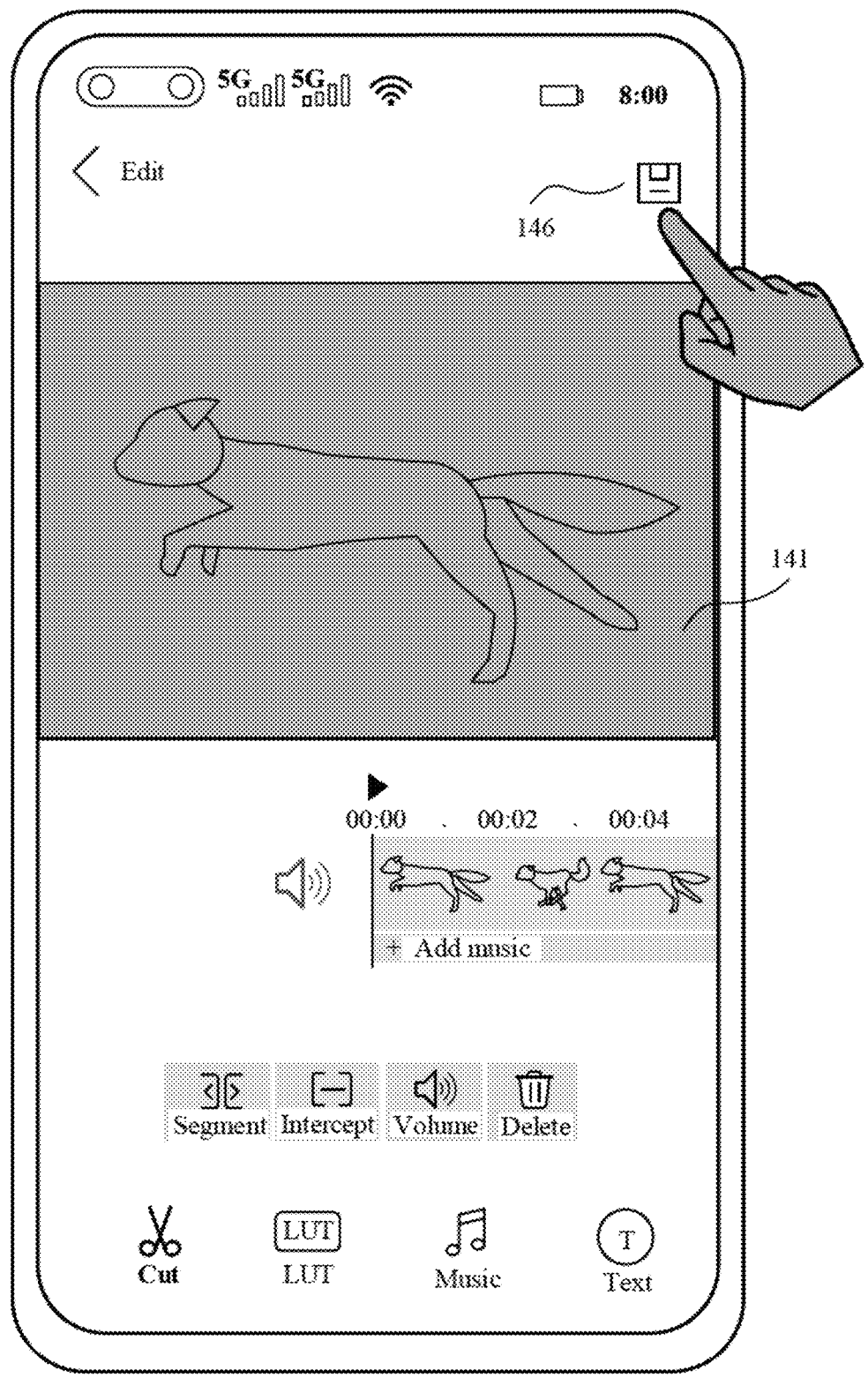
Figure 1H:
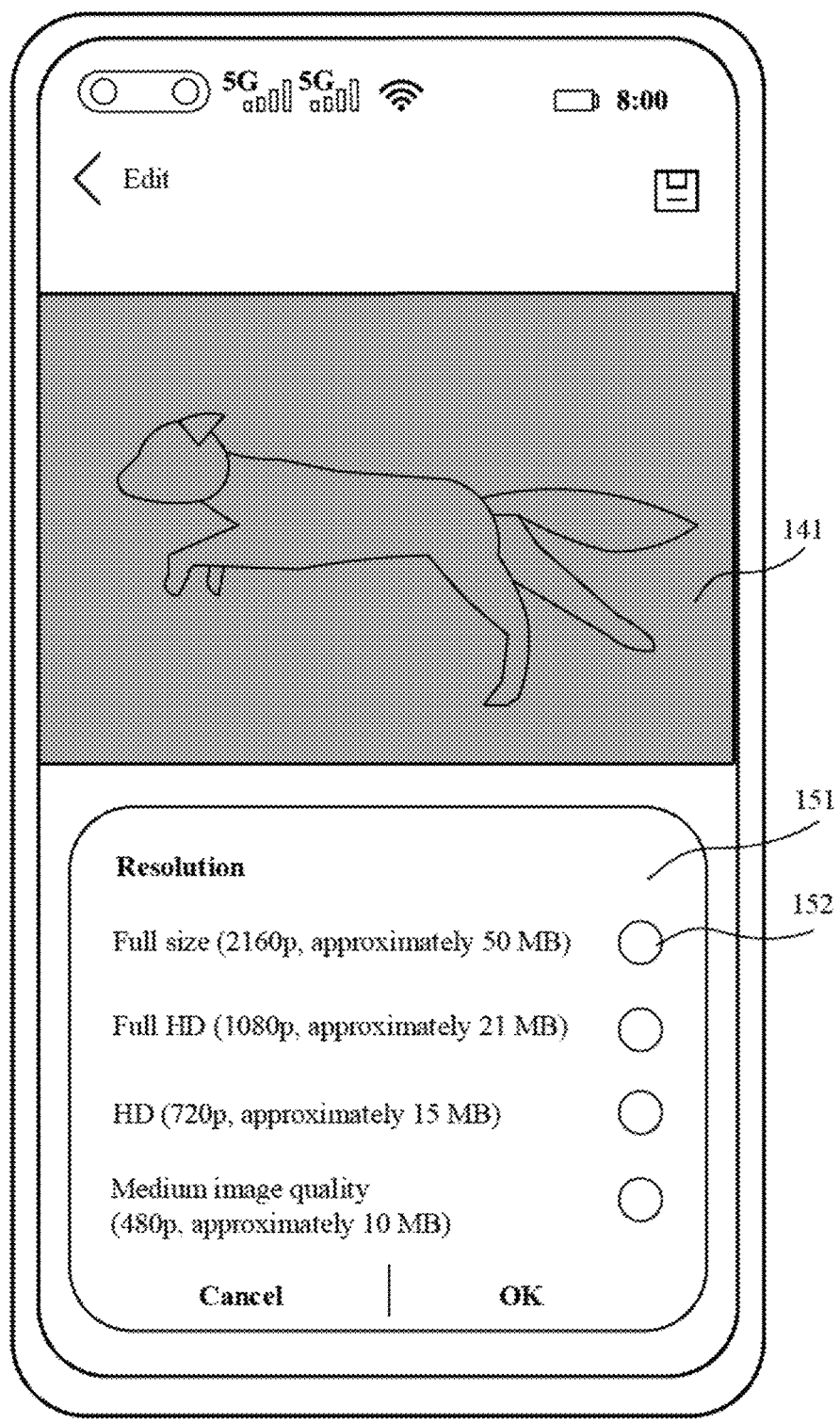
Figure 1I:
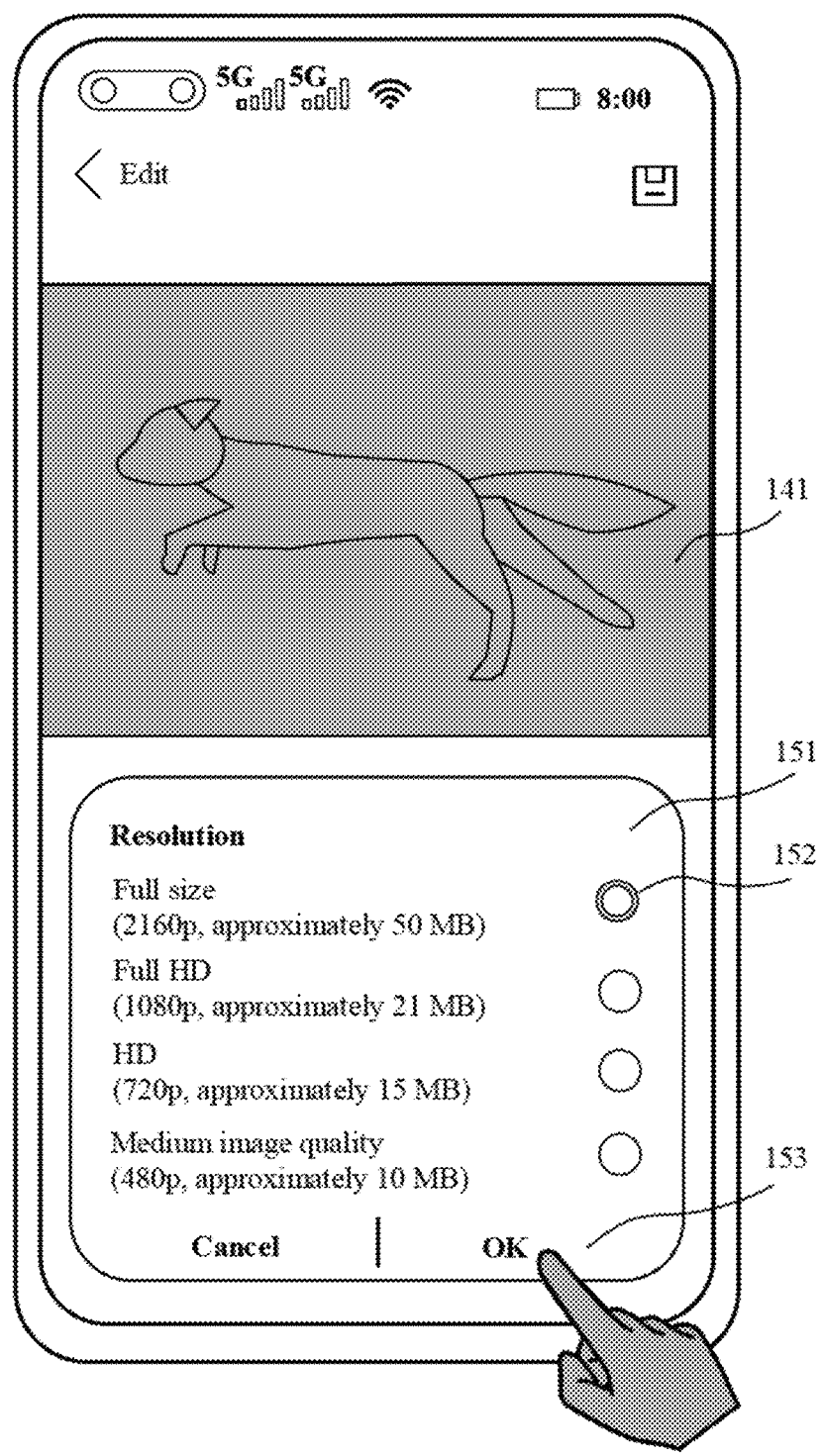

FIG. 1H shows an example of a user interface in which an electronic device 100 displays a resolution option existing during video saving. The user interface includes a window 151. In other words, the electronic device 100 may display the window 151 when detecting the user operation performed on the Save control 146.

The window 151 may display a plurality of video resolution options, for example, Option 1: Full size (2160p, approximately 50 MB); Option 2: Full HD (1080p, approximately 21 MB); Option 3: HD (720p, approximately 15 MB); and Option 4: Medium image quality (480p, approximately 10 MB).

Each option is followed by a button, for example, a button 152. The user may tap the button to select a resolution option corresponding to the button. For example, the electronic device 100 may detect a user operation performed on the button 152. In response to the operation, the electronic device 100 may display a user interface shown in FIG. 1I. In the user interface shown in FIG. 1I, the button 152 changes from an original circle to an annulus. In this case, the annulus may indicate that a resolution option currently selected by the user is Option 1. In another embodiment, when detecting a user operation performed on a text in each option, the electronic device 100 may also change a button corresponding to the option to an annulus.

Figure 1J:
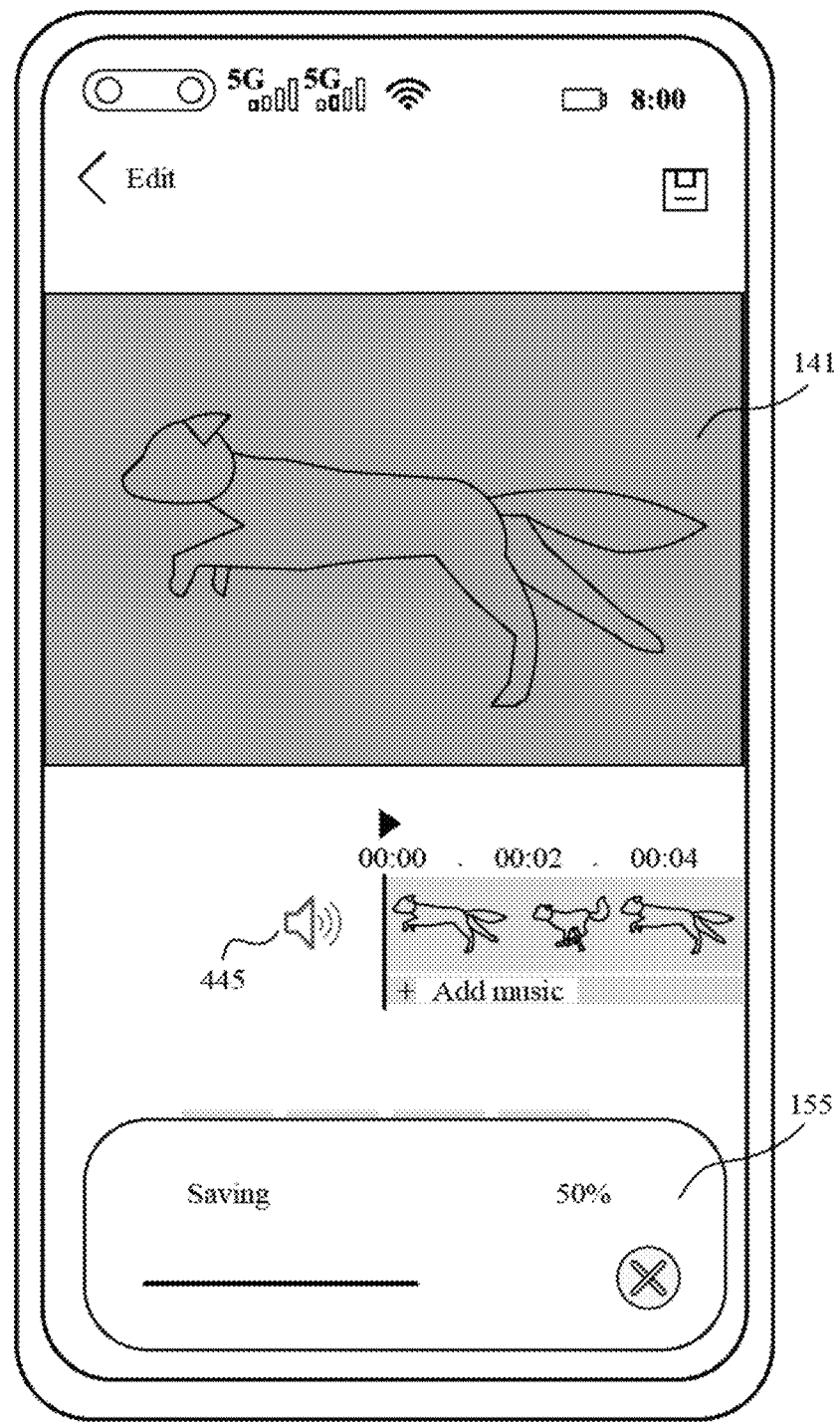

Then, the electronic device 100 may detect a user operation performed on an OK control 153. In response to the operation, the electronic device 100 may display a user interface shown in FIG. 1J. As shown in FIG. 1J, in this case, the electronic device 100 may display a window 155. The window 155 may be used to prompt the user of a saving progress.

When completing saving, the electronic device 100 may display a user interface in which the electronic device 100 specifically displays a picture or video. In this case, the video (or the picture) displayed in the user interface is an edited video (or a picture).

Figure 1K:
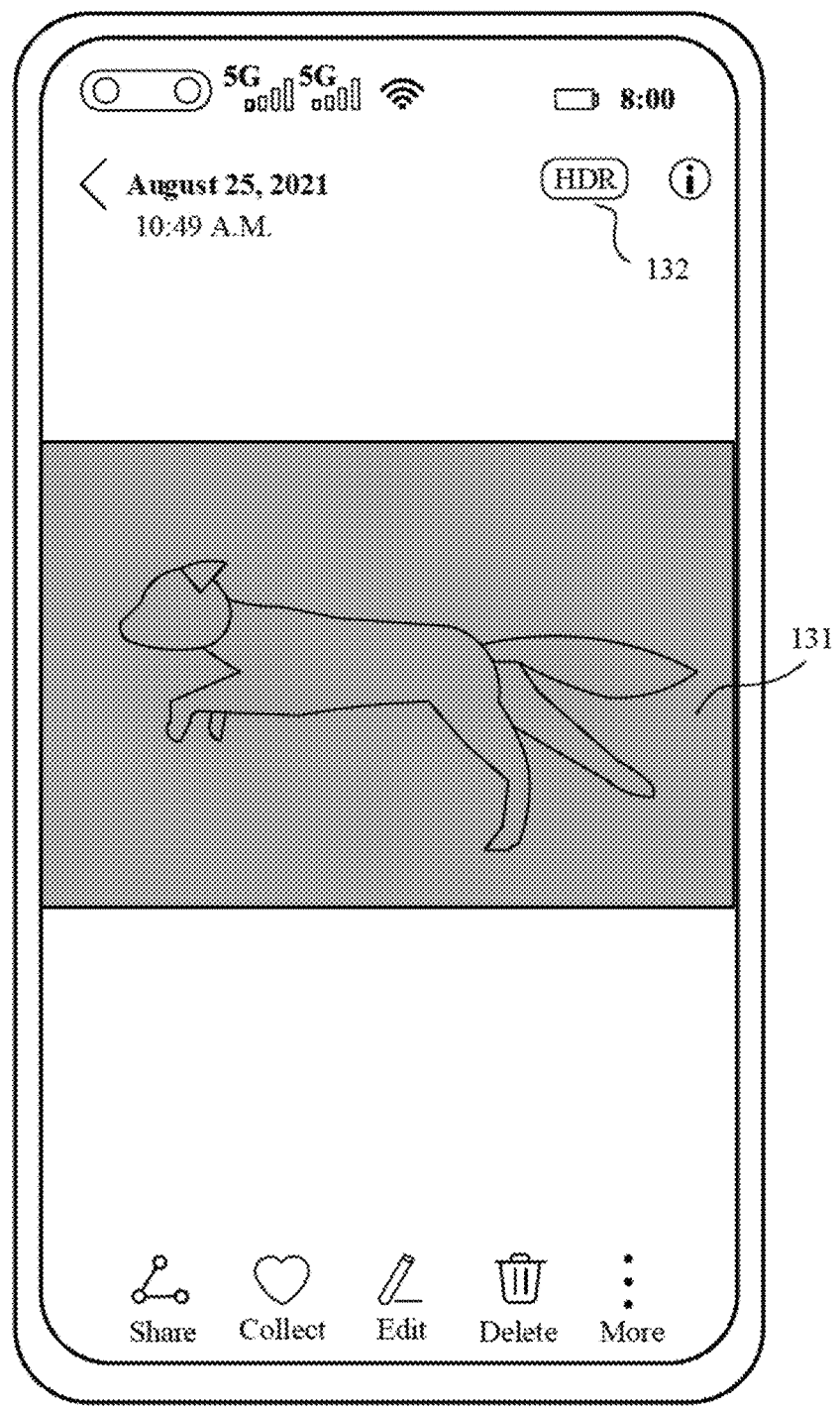

As shown in FIG. 1K, after saving is completed, the original user interface of the video "Video A" shown in FIG. 1C changes to a user interface shown in FIG. 1K. In this case, the video "Video A" displayed in the window 131 is different from the original video "Video A" shown in FIG. 1C. For example, with reference to the editing operation indicating to add a LUT filter in the user interface, in this case, the image color of "Video A" in FIG. 1K may be different from the image color of "Video A".

In addition, a type of a video indicated by the icon 132 also changes. Specifically, the video of the LOG type may be converted into an HDR-type video after the LUT filter is added.

FIG. 1A to FIG. 1K show an example of a user interface in which an electronic device 100 displays a case in which a user edits a LOG video (adds a LUT filter to the LOG video). In another embodiment, the edited video may alternatively be an HDR video, or an SDR video.

For example, in the user interface shown in FIG. 1B, the electronic device 100 may also detect a user operation performed on the icon 121. In response to the operation, the video displayed in the window 131 in the user interface shown in FIG. 1C may also be a video ("Video B") indicated by the icon 121. Further, the electronic device 100 may also display a user interface in which the video "Video B" is edited. After completing editing, the electronic device 100 may save the edited video as an HDR-type video.

By implementing the method in FIG. 1A to FIG. 1K, the user may edit the captured 10-bit LOG video and the 10-bit HDR video, and save the edited video as a 10-bit HDR video after completing editing. Compared with a usual method for saving an edited 10-bit video as an 8-bit video, according to the method, it can be ensured that video quality of the edited video is not reduced. Therefore, use experience of the user is not reduced.

Figure 2:
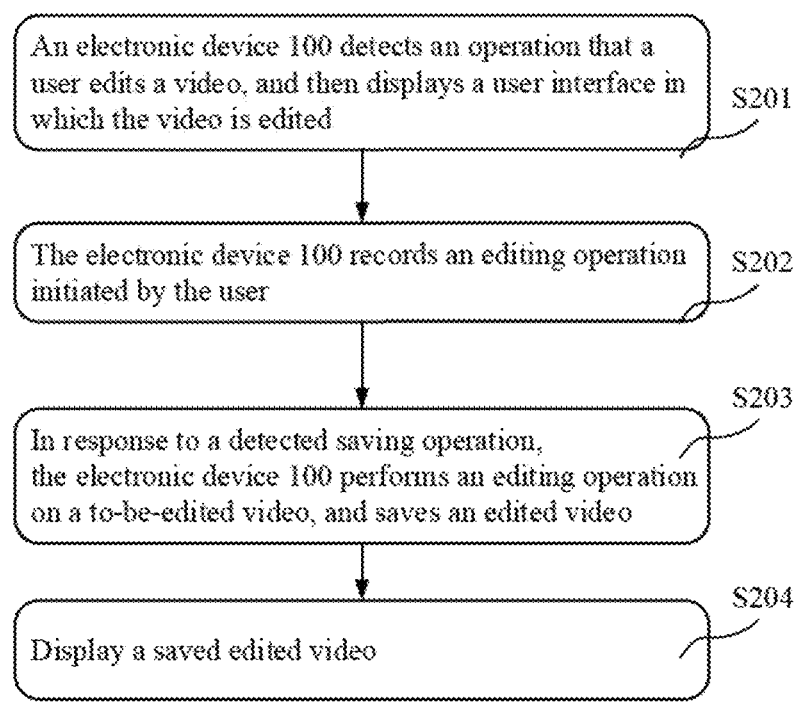
FIG. 2 is a flowchart in which an electronic device processes a video editing service according to an embodiment of this application.

FIG. 2 is an example flowchart in which an electronic device 100 processes a video editing service. With reference to FIG. 2 and the user interfaces in FIG. 1A to FIG. 1K, the following describes, in detail in a subsequent embodiment, a procedure in which the electronic device 100 processes the video editing service.

As shown in FIG. 2, the procedure in which the electronic device 100 processes the video editing service includes S201 to S204.

S201: The electronic device 100 detects an operation that a user edits a video, and then displays a user interface in which the video is edited.

Referring to the user interface shown in FIG. 1B, the electronic device 100 may display one or more pictures or videos in a scenario in which a Gallery application runs. The video includes an HDR video with a bit depth of 10 bits and a LOG video with the bit depth of 10 bits, and includes an SDR video with a bit depth of 8 bits. When the electronic device 100 displays the user interface, the user may browse, in the interface, pictures or videos stored in the electronic device 100.

In the scenario, the electronic device 100 may detect an operation that the user selects a video and edits the video. In this case, the electronic device 100 may determine detail information of the edited video, including a type, a bit depth, an encoding format, and the like of the video. For example, when detecting a user operation performed on an icon 133 (the LOG video), the electronic device 100 may determine that the edited video is a video displayed in a window 131, and that the video is a video of a LOG type, the bit depth of the video is 10 bits, and the color encoding format is a YUV format.

After determining the bit depth of the edited video, the electronic device 100 may determine a video editing method specifically used subsequently. For example, when determining that the edited video is an 8-bit video, the electronic device 100 may determine to use an existing editing method in which an edited video is saved as an 8-bit video, for example, the foregoing method in which a color format is converted during video encoding after rendering is implemented by invoking a C2D engine. When determining that the edited video is a 10-bit video, the electronic device 100 may determine to use the editing method in which an edited video is saved as a 10-bit video provided in this embodiment of this application.

When determining the type of the edited video, the electronic device 100 may further display a user interface provided for the user to edit the video. Reference is made to the user interfaces shown in FIG. 1D to FIG. 1G.

S202: The electronic device 100 records an editing operation initiated by the user.

When displaying the user interface in which the video is edited in FIG. 1D, the electronic device 100 may detect an operation performed by the user on an edit control in the interface. For example, the electronic device 100 may detect an operation performed on a LUT filter control in an action bar 143. The electronic device 100 may further detect an operation performed on another editing control (Cut, Music, or the like), or the like.

It can be understood that in operations detected by the electronic device 100, some user operations are valid operations, and the other operations are invalid operations. Herein, the valid operation is an operation to be performed by the electronic device 100 in a video editing process, and the invalid operation is an operation that is not to be performed by the electronic device 100 in the video editing process. For example, referring to FIG. 1F, after detecting an operation performed on an OK control 147, the electronic device 100 may confirm that an operation that the user selects a filter "LUT 4" is a valid operation, and on the contrary, if the electronic device 100 detects a user operation performed on a Cancel control 148, the electronic device 100 may confirm that the operation that the user selects the filter "LUT 4" is an invalid operation.

After determining a valid operation in all editing operations initiated by the user, the electronic device 100 may record the valid operation. The recorded valid operation may be sorted based on a time point at which the user initiates the operation.

S203: In response to a detected saving operation, the electronic device 100 performs an editing operation on a to-be-edited video, and saves the edited video.

In a process of displaying the user interface (FIG. 1D to FIG. 1G) provided for the user to edit the video, the electronic device 100 may detect an operation that the user saves the video after completing editing. For example, as shown in FIG. 1G, the electronic device 100 may detect a user operation performed on a Save control 146.

In this case, the electronic device 100 may perform environment initialization. Environment initialization is a process in which the electronic device 100 creates a tool required in a video editing process and applies for storage space required in the video editing process. After completing initialization, the electronic device 100 sequentially performs the editing operation on the to-be-edited video based on the editing operation recorded in S202, to obtain the edited video.

If the edited video is a video of a 10-bit type, the electronic device 100 may save the edited video as a video of the 10-bit type; and if the edited video is a video of an 8-bit type, the electronic device 100 may save the edited 8-bit video as the 8-bit video. A method for saving an edited 8-bit video as an 8-bit video is the conventional technology. Details are not described herein. A processing procedure in which the electronic device 100 saves an edited 10-bit video as a 10-bit video is mainly described in this embodiment of this application. Reference is made to a subsequent embodiment. Details are not described herein.

Optionally, the electronic device 100 may display a progress bar in a video saving process. For example, the electronic device 100 may display the window 155 (progress bar) shown in FIG. 1J.

S204: Display the saved edited video.

After completing saving of the edited video, the electronic device 100 may display the saved edited video. Referring to FIG. 1K, in this case, the video displayed in the window 131 is the edited video. In the user interface shown in FIG. 1C, the video displayed in the window 131 is a video existing before being edited by the user.

S204 is optional. In another embodiment, after completing saving of the edited video, the electronic device 100 may display a sharing interface, or the like. This is not limited in this embodiment of this application.

Figure 3:
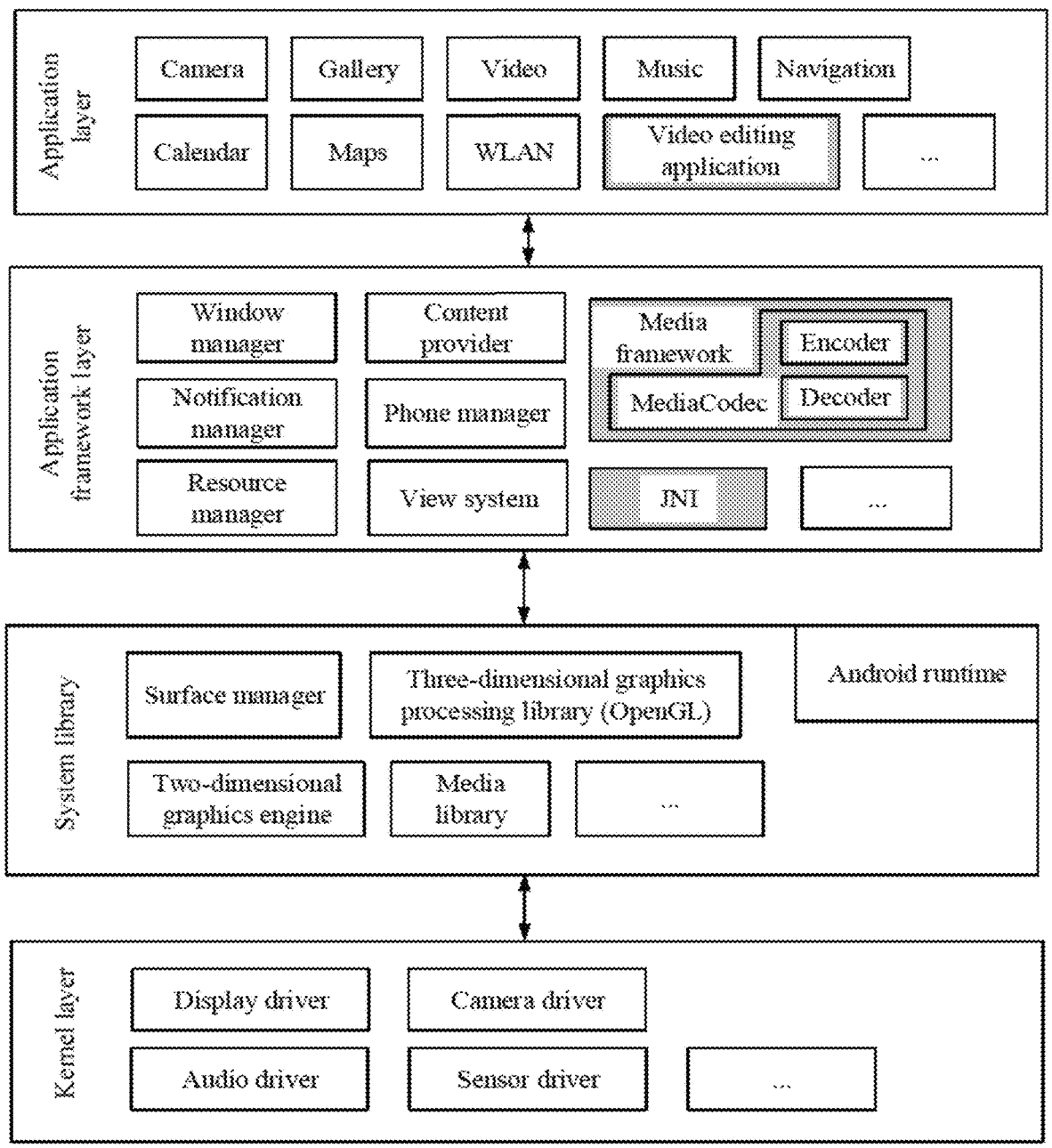
FIG. 3 is a diagram of a software architecture of an electronic device according to an embodiment of this application.

FIG. 3 shows an example of a software structure of an electronic device 100. In this embodiment of this application, the following describes, with reference to FIG. 3, a software architecture in which the electronic device 100 saves an edited 10-bit video as a 10-bit video.

A layered architecture, an event-driven architecture, a microcore architecture, a microservice architecture, or a cloud architecture may be used for a software system of the electronic device 100. In this embodiment of the present invention, an Android system with a layered architecture is used as an example to describe a software structure of the electronic device 100.

In the layered architecture, software is divided into several layers, and each layer has a clear role and task. The layers communicate with each other through a software interface. In some embodiments, the Android system is divided into four layers, and the four layers are respectively an application layer, an application framework layer, an Android runtime (Android runtime) and system library layer, and a kernel layer from top to bottom.

The application layer may include a series of application packages. As shown in FIG. 3, the application packages may include applications such as Camera, Gallery, Calendar, Phone, Maps, Navigation, WLAN, Bluetooth, Music, Videos, and Messages.

In this embodiment of this application, the application layer further includes a video editing application. The video editing application has a video data processing capability, and can provide a user with a video editing function, including video data processing such as cutting and rendering.

The application framework layer provides an application programming interface (application programming interface, API) and a programming framework for an application at the application layer. The application framework layer includes some predefined functions. As shown in FIG. 3, the application framework layer may include a window manager, a content provider, a view system, a phone manager, a resource manager, a notification manager, and the like.

The window manager is used to manage a window program. The window manager may obtain a size of a display, and determine whether there is a status bar, a lock screen, a screen capture, or the like. The content provider is configured to store and obtain data, so that the data can be accessed by an application. The data may include a video, an image, audio, a made call, an answered call, a browsing history and bookmark, a phonebook, and the like. The view system includes a visual control, for example, a control for displaying a text, or a control for displaying a picture. The view system may be configured to construct an application. A display interface may include one or more views. For example, a display interface including a message notification icon may include a view for displaying a text and a view for displaying a picture.

The phone manager is configured to provide a communication function of the electronic device 100, for example, management of a call status (including an answered state, a declined state, or the like). The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction. For example, the notification manager is configured to: notify that downloading is completed, or prompt a message. The notification manager may alternatively be a notification that appears in a top status bar of the system in a form of a graph or a scroll bar text, for example, a notification of an application running in the background or a notification that appears on a screen in a form of a dialog window. For example, text information is prompted in the status bar, a prompt tone is produced, the electronic device vibrates, or an indicator blinks.

In this embodiment of this application, the application framework layer further includes a media framework. A plurality of tools for editing a video and audio are provided in the media framework. The tool includes MediaCodec. MediaCodec is a class provided by Android to encode and decode audio and a video. MediaCodec includes an encoder, a decoder, and a surface-type buffer.

An encoder provided by MediaCodec may convert, into another format by using a compression technology, a video or audio that is in a specific format and that is input into the encoder. The decoder performs a reverse process of encoding, to convert, into another format by using a decompression technology, a video or audio that is in a specific format and that is input into the decoder.

For example, it is assumed that a decoded video is an HDR video in a 10-bit YUV format, after receiving the HDR video input by an application, the decoder may deframe the HDR video, to split the encapsulated HDR video into frames of image data in the 10-bit YUV format. Then, the encoder may re-encode the image data that is in the 10-bit YUV format and that is obtained through splitting, to re-encapsulate, into an HDR video in the 10-bit YUV format, the image data that is in the 10-bit YUV format and that is obtained through splitting.

MediaCodec may further apply for a block of memory of a surface type (referred to as a surface below). The surface may be configured to buffer video data. For example, after the electronic device 100 performs the editing operation to obtain a rendered video image frame, the electronic device 100 may input the image frame into the surface buffer. Then, the application may obtain the rendered video image frame from the surface for storage, display, or the like.

In this embodiment of this application, the application framework layer further includes a java native interface (Java Native Interface, JNI). The JNI may be configured to set a color format of video data that the surface supports to carry. The surface has a default color format of the video data that the surface supports to carry. Usually, the surface supports to receive video data in an 8-bit format, in other words, receive the video data in the 8-bit format by default. The electronic device 100 may modify, to 10 bits through the JNI, a format of the received video data supported by the surface. Therefore, the surface may be configured to buffer video data in a 10-bit format.

The Android runtime includes a core library and a virtual machine. The Android runtime is responsible for scheduling and management of an Android system. The core library includes two parts: One part is a function that needs to be called in java language, and the other part is a core library of Android.

The application layer and the application framework layer run on a virtual machine. The virtual machine converts a java file at the application layer and the application framework layer into a binary file for execution. The virtual machine is configured to perform functions such as object lifecycle management, stack management, thread management, security and abnormality management, and garbage collection.

The system library may include a plurality of functional modules such as a surface manager (surface manager), a media library (Media Libraries), a three-dimensional graphics processing library (for example, OpenGL ES), and a 2D graphics engine (for example, SGL). The surface manager is configured to manage a display subsystem, and provide fusion of 2D and 3D layers for a plurality of applications. The media libraries support playback and recording of a plurality of common audio and video formats, a still image file, and the like. The media library may support a plurality of audio and video encoding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a graphics engine for 2D drawing.

The open graphics library (Open Graphics Library, OpenGL) provides a plurality of image rendering functions, and the plurality of image rendering functions may be used to draw an image ranging from a simple graphic to a complex three-dimensional scene. In this embodiment of this application, the OpenGL provided by the system library may be configured to support the video editing application to perform an image editing operation, for example, a video cutting operation or a filter addition operation.

The kernel layer is a layer between hardware and software. The kernel layer includes at least a display driver, a camera driver, an audio driver, and a sensor driver.

Figure 4:
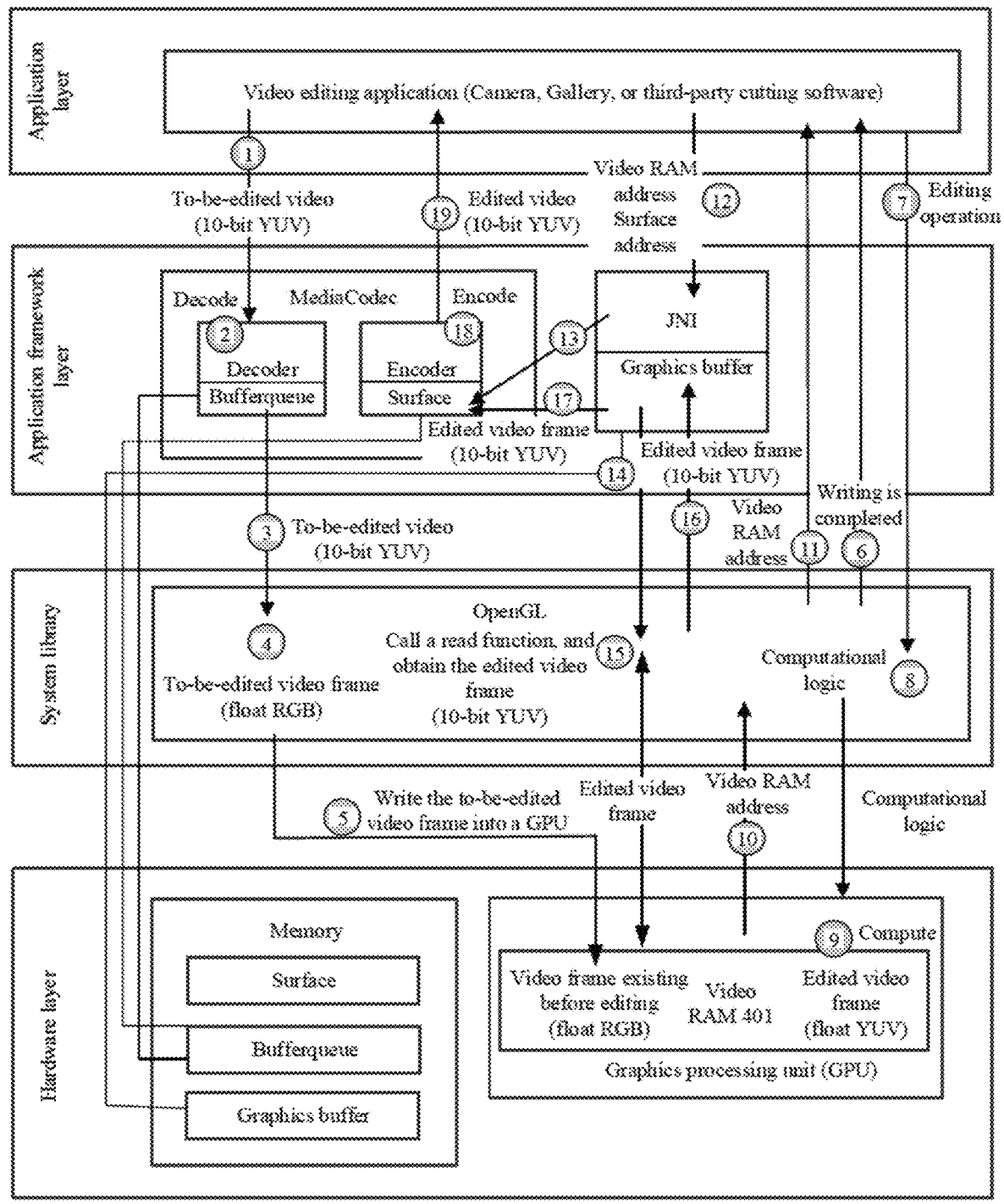
FIG. 4 is a diagram of another software architecture of an electronic device according to an embodiment of this application.

Referring to the diagram of the software architecture shown in FIG. 3, further, the software architecture shown in FIG. 3 may be specifically shown in FIG. 4. In particular, a hardware layer is further included in FIG. 4. The kernel layer in FIG. 3 is not embodied in FIG. 4.

The hardware layer includes a memory (memory) and a graphics processing unit (GPU). The memory may be configured to temporarily store operational data in a central processing unit and data exchanged with an external memory such as a hard disk. The GPU is a processor that performs an image and graphic-related operation. In this embodiment of this application, storage space required by the electronic device 100 to run the video editing application may be provided by the memory, including the surface, a data conveyor bufferqueue, and the like. A process in which the electronic device 100 edits a video by using the OpenGL and processes a video frame may be completed by the GPU.

The following describes, with reference to FIG. 4 in an embodiment of this application, a processing procedure in which an electronic device 100 saves an edited 10-bit video as a 10-bit video in a step in S203.

In a scenario of editing and saving the 10-bit video shown in FIG. 1A to FIG. 1K, after detecting a user operation of saving the video, an operation to be performed by the electronic device 100 may include two parts: One is to initialize an editing environment; and the other is to perform an editing operation and output an edited video.

The following first describes a process of initializing the editing environment.

Referring to a description of S204, initializing the editing environment includes: creating a tool required in a video editing process, applying for storage space required in the video editing process, or the like. In this embodiment of this application, the tool include an encoder for video data format encoding, a decoder for video data format decoding, and a tool OpenGL for user image rendering. The storage space includes a surface provided by a memory, a data conveyor (BufferQueue), and a video RAM provided by a GPU.

Figure 5A:
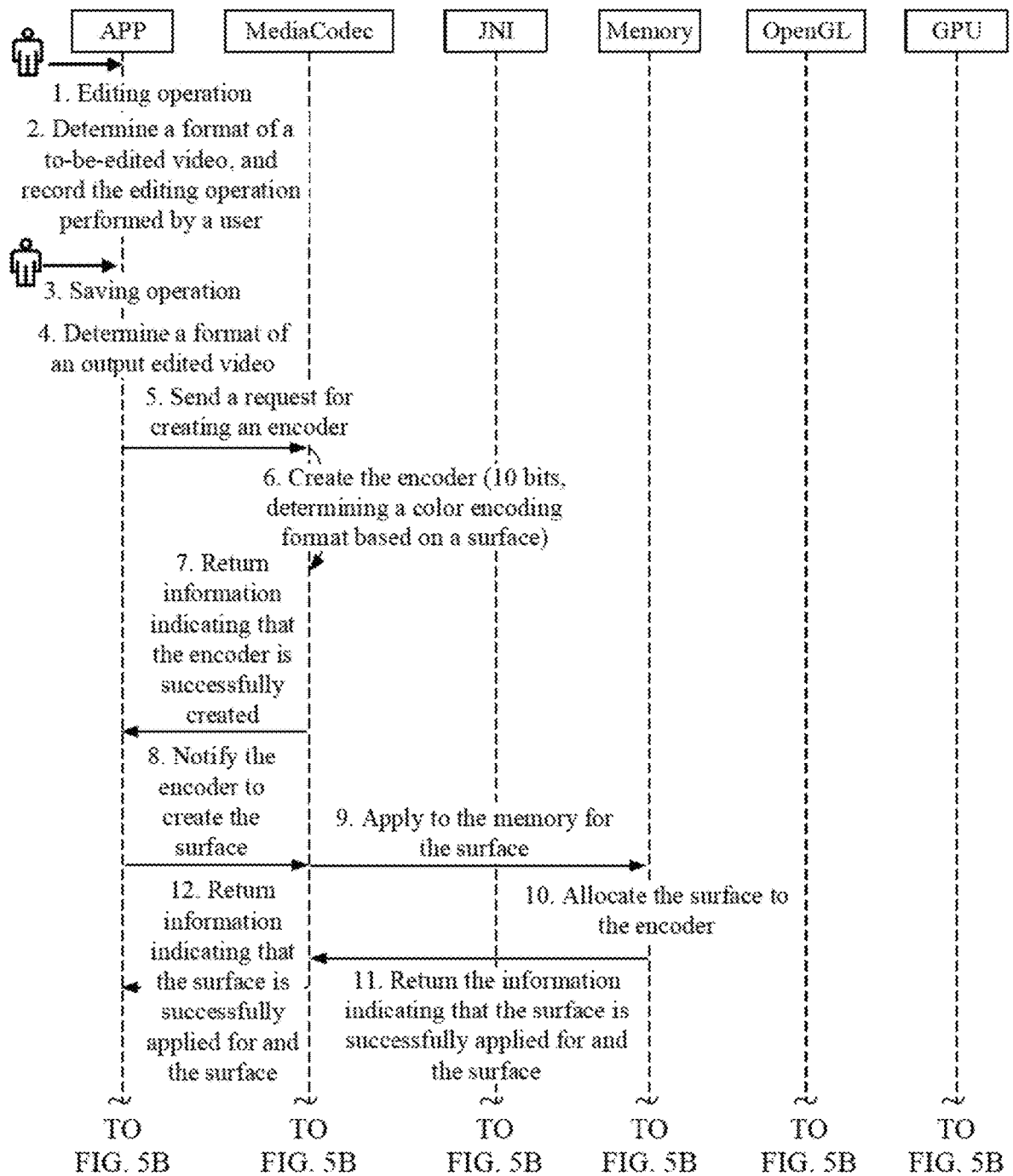
FIG. 5A and FIG. 5B are a data flowchart in which an electronic device initializes a video editing environment according to an embodiment of this application.
Figure 5B:
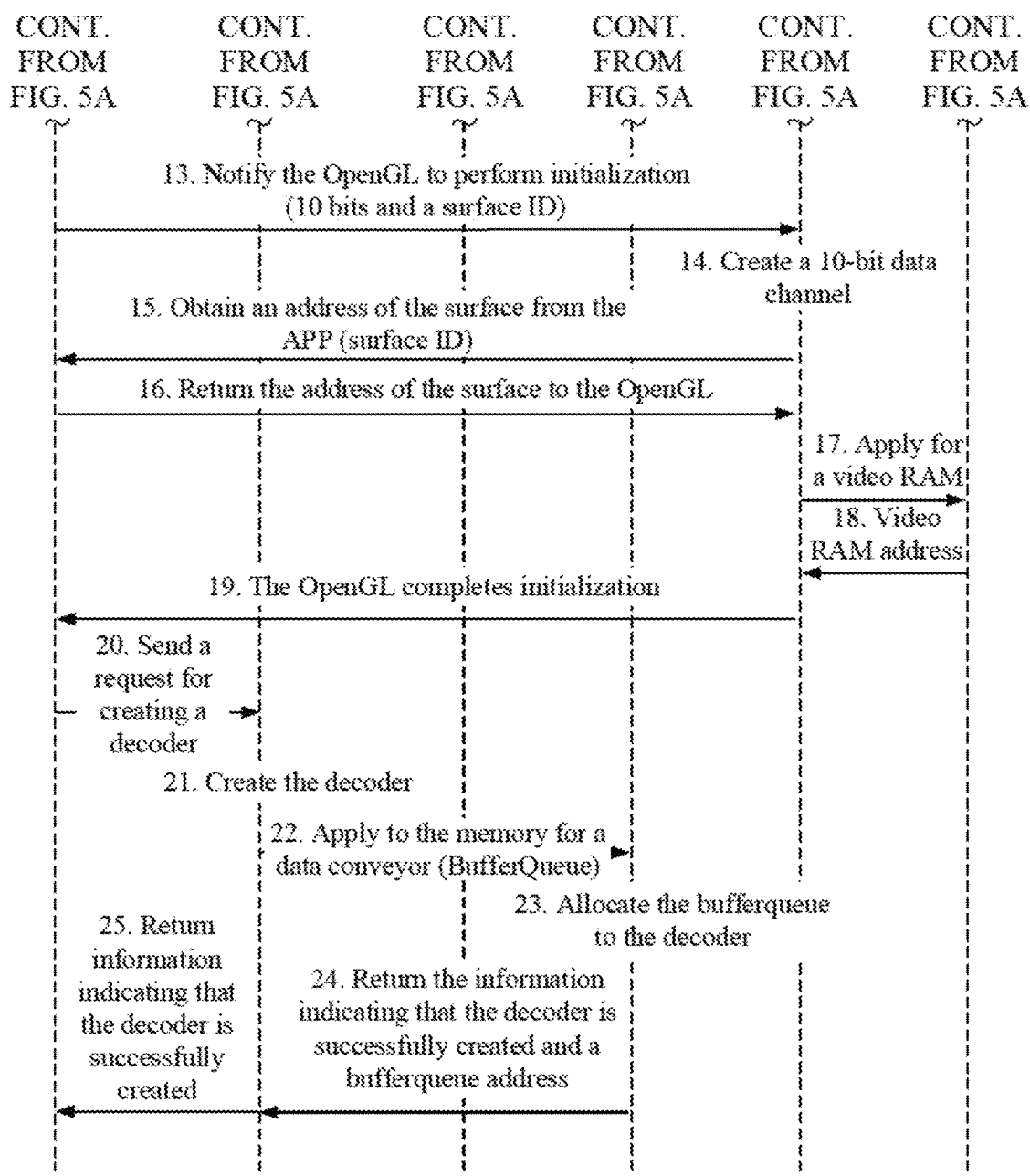

Specifically, FIG. 5A and FIG. 5B are an example of a data flowchart in which an electronic device 100 initializes an environment.

(1) First, an APP may detect a video editing operation before detecting a user operation of saving a video. As shown in FIG. 1C, when detecting a user operation performed on a control 133, the electronic device 100 may determine that the video editing operation is detected.

(2) The electronic device 100 may determine a format of a to-be-edited video. Herein, the format of the video includes a bit depth information, a color encoding format, and the like. For example, in FIG. 1C, the electronic device 100 may determine that the bit depth of the to-be-edited video (Video A) is 10 bits, and the color encoding format is a YUV format.

Then, the electronic device 100 may display a user interface in which the video is edited (FIG. 1D to FIG. 1J). In a process of displaying the user interface in which the video is edited, the electronic device 100 may record an editing operation selected by a user, including a type of the editing operation, an execution sequence, and the like. For example, the electronic device 100 may record an editing operation of adding a filter "LUT 4" shown in FIG. 1F. When further detecting a video cutting operation after the filter "LUT 4" is added, the electronic device 100 records the cutting operation and a sequence in which a filter is added and then the cutting operation is performed.

In this case, the electronic device 100 does not perform, on the to-be-video after detecting an editing operation, image processing indicated by the editing operation, only to improve computing efficiency, and avoid repeated computation and invalid computation.

(3) After completing editing, the APP detects a video saving operation. As shown in FIG. 1G, when detecting a user operation performed on a control 146, the electronic device 100 may determine that the video saving operation is detected. In another embodiment, the saving operation may also be a preset periodic saving operation. This is not limited in this embodiment of this application.

(4) Subsequently, the electronic device 100 may determine a format of an output edited video. Specifically, when the to-be-edited video is a 10-bit LOG video and the editing operation includes adding a LUT filter, the electronic device 100 may determine that the output edited video is a 10-bit HDR video; when the to-be-edited video is a 10-bit HDR video and the editing operation includes an audio editing/cutting operation but does not include a filter addition operation, the electronic device 100 may determine that the output edited video is a 10-bit HDR video; and when the to-be-edited video is a 10-bit HDR video and the editing operation includes the filter addition operation, the electronic device 100 may determine that the output edited video is an 8-bit SDR video.

In an editing scenarios shown in FIG. 1D to FIG. 1J, the to-be-edited video is a 10-bit LOG video, and the editing operation includes an operation of adding the LUT filter. Therefore, after detecting the video saving operation, the electronic device 100 determines that the output edited video needs to be a 10-bit HDR video. After detecting the saving operation, in other words, after determining the format of the to-be-edited video, the editing operation, and the format of the output edited video, the electronic device 100 may initialize the editing environment (5 to 25).

(5) First, the APP may send, to MediaCodec, a request for creating an encoder. The request may carry a bit depth and a color encoding format of a video frame that the created encoder supports to carry. However, because a 10-bit YUV format is a special combination of the bit depth and the color encoding format, the APP cannot directly convey, to the MediaCode, two parameters, namely, 10 bits, YUV. In other words, the APP cannot directly indicate MediaCodec to create an encoder configured to encode a video frame in the 10-bit YUV format. In this case, indication information included in the request sent by the APP to MediaCodec to create the encoder includes: indicating MediaCodec to create an encoder (convey a parameter 10 bits) that supports to encode a video frame with a bit depth of 10 bits, and indicating that the encoder may set, based on a color encoding format of a video frame that the surface supports to carry, a color encoding format of a video frame that is supported by the encoder.

(6) In response to the request, MediaCodec may create, based on the request, an encoder configured to encode a video with the bit depth of 10 bits, and set the encoder to determine, based on the color encoding format of the video frame that the surface supports to carry, a color encoding format of a video frame that is supported by the encoder.

For example, when the to-be-edited video is a video in the 10-bit YUV format, the request sent by the APP to MediaCodec to create the encoder includes bit depth information (10 bits) and indication information of the color encoding format. The indication information is used to indicate the encoder to determine, based on the color encoding format of the video frame that the surface supports to carry, the color encoding format of the video frame supported by the encoder. In response to the request, MediaCodec may create an encoder that supports to encode a video frame with the bit depth of 10 bits. In addition, MediaCodec does not set the color encoding format of the video frame that the encoder supports to encode, but instead, the encoder sets a color encoding format of the encoder after determining the color encoding format of the video frame that the surface supports to carry.

(7) After creating the encoder, MediaCodec may return, to the APP, information indicating that the encoder is created. The confirmation information indicating that the encoder is created is, for example, a confirmation character ACK.

(8) After receiving the confirmation information indicating that the encoder is successfully created, the APP may send, to the encoder, a request for creating the surface. (9) In response to the request, the encoder may apply to the memory for the surface for carrying data. The surface is an object with a specific data structure. Usually, the surface is dedicated to carrying a to-be-encoded image frame. In response to the application, the memory may allocate a block of memory, namely, the surface to the encoder. Usually, the memory allocated by the memory to the encoder supports to carry video frame data with a bit depth of 8 bits. Herein, the surface applied for by the encoder supports to carry the video frame data with the bit depth of 8 bits.

The memory may provide a plurality of surfaces. Each surface carries an identity (ID) indicating the surface. For any surface, an ID of the surface is in a one-to-one correspondence with an address of the surface. For example, an ID of a surface-01 is 01, and an address of the surface is 0011-0100. When it is identified that an ID of a surface is 01, the electronic device 100 may determine that the surface is the surface-01, and may further determine that the address of the surface is 0011-0100. On the contrary, when it is identified that the address used by a surface is 0011-0100, the electronic device 100 may determine that the surface is the surface-01.

(10) After receiving a request of the encoder for applying for the surface, the memory may allocate a block of memory space of a surface type to the encoder, to use the memory space as the surface applied for by the encoder, so that the encoder uses the memory space. (11) Then, the memory may return, to the encoder, confirmation information indicating that the surface is successfully applied for and the surface, including the ID of the surface and/or the address of the surface. (12) Further, the encoder may return, to the APP, the confirmation information indicating that the surface is successfully applied for and the surface. Therefore, the APP may determine the ID of the surface applied for by the encoder, and/or the address of the surface.

(13) After the surface is applied for, the APP may notify the OpenGL to perform initialization. The notification may include the bit depth of the to-be-edited video and the ID of the surface that is previously applied for. The bit depth of the to-be-edited video may be determined in step (2). (14) After receiving the notification, the OpenGL may determine the bit depth of the to-be-edited video, and create a data channel with the corresponding bit depth. For example, a data channel with the bit depth of 10 bits is created for a video in a 10-bit format, and a current data channel may be used to transmit a video frame in a 10-bit (1024) color format.

(15) In this case, the OpenGL may send, to the application (APP) based on the ID that is of the surface and that is carried in the notification, a request for querying an address of a surface corresponding to the ID of the surface. The request carries the ID of the surface. (16) In response to the request, the APP may determine the address of the surface based on the ID of the surface, and transmit the address back to the OpenGL. Subsequently, the OpenGL may store an edited video frame in a memory corresponding to the address of the surface.

(17) In addition, after receiving the initialization notification, the OpenGL further applies to the GPU for a storage block, namely, a video RAM (a video RAM 401). The video RAM may be configured to buffer the to-be-edited video. The video RAM 401 may be a texture (texture) in the OpenGL or a frame buffer object (Frame Buffer Object). (18) When the storage block is successfully applied for, the GPU may return, to the OpenGL, information indicating that the storage block is successfully applied for and an address of the video RAM. (19) Further, the OpenGL may return confirmation information to the APP. The confirmation information may indicate that the OpenGL has completed initialization.

(20) Then, similar to a case of creating the encoder, the APP may send, to MediaCodec, a request for creating the decoder. The request for the decoder is used to create the decoder. (21) MediaCodec may create the decoder in response to the request. Subsequently, the decoder may determine a specific type of a to-be-decoded video based on an input format of the to-be-decoded video.

(22) When the decoder is created, the decoder further applies to the memory for a block of memory (denoted as BufferQueue). The memory may be configured to buffer video data, and may transmit decoded video data to the application. (23) In response to the request, the memory may allocate a segment of memory space to the decoder, to use the memory space as the BufferQueue, so that the decoder uses the memory space. (24) After the memory is successfully applied, the memory returns an address of the BufferQueue to the decoder. (25) Further, the decoder may return, to the APP, confirmation information indicating that the decoder is successfully created.

In another embodiment, the APP may alternatively create the decoder and then create the encoder. This is not limited in this embodiment of this application.

(1) to (25) in FIG. 5A and FIG. 5B describe in detail a process in which the APP performs initialization after detecting the video saving operation, including creating the encoder, the surface, the decoder, and the data conveyor, and initializing an operating environment of the OpenGL. After completing initialization in (1) to (25), the electronic device 100 may start to edit and save the video.

Returning to the diagram of the software architecture shown in FIG. 4, after completing an initialization process, a video editing application (APP) may send, to a decoder, a to-be-edited video and information describing the to-be-edited video. The information describing the to-be-edited video may carry a bit depth, a color format, and the like of the video (step 1, namely, a gray circle identifier 1: ①). A reason is that a video in the APP is an encapsulated video. Before editing the video, the APP needs to first decapsulate the video into frames of images, namely, a video frame, to subsequently render the video frame, and implement user-specified video editing.

After receiving the to-be-edited video, first, the decoder may identify the information describing the to-be-edited video, including the bit depth, the color encoding format, and the like of the video. Based on the information, the decoder may determine a decoding manner applicable to the type of to-be-edited video, and further decode the to-be-edited video into the frames of images, namely, the video frame (step 2, where reference is made to the identifier in step 1 in FIG. 4, for another subsequent step, reference is also made to step 1, and details are not described herein again).

For example, the video editing application may send, to the decoder, an HDR video (the to-be-edited video) whose bit depth is 10 bits and color format is a YUV format. The information describing the to-be-edited video may include content such as the bit depth of 10 bits and the color format (the YUV format). By identifying the information describing the to-be-edited video, the decoder may obtain the information about the to-be-edited video, and further determine a type of the to-be-edited video (a 10-bit YUV format). Then, the decoder may then decode the video in the 10-bit YUV format. After the decoder performs decoding, the decoder may output the video frame (a to-be-edited video frame) of the to-be-edited video. A format of each video frame is also the 10-bit YUV format.

After the video is decoded, a video frame sequence output by the decoder may be sent to a system library an OpenGL (step 3).

Because the OpenGL only supports processing (for example, a computation operation) of a video frame in an RGB format, (step 4) when receiving the video frame sequence sent by the decoder, and a color encoding format of the video frame sequence is the YUV format, the OpenGL may convert the received to-be-edited video frame in the YUV format into a video frame in the RGB format. In addition, the OpenGL may normalize a video frame with a bit depth of 10 bits, and convert the video frame with the bit depth of 10 bits into a video frame in a float (float) RGB format.

In a video frame processing process, a video RAM of a GPU is used to carry a to-be-processed video frame, and the OpenGL is mainly configured to deliver computational logic to the OpenGL, to guide the GPU to perform image computing. Therefore, after obtaining a to-be-edited video frame in the float RGB format, the OpenGL stores the to-be-edited video frame in the GPU. Specifically, in the initialization process shown in FIG. 5A and FIG. 5B, referring to (17), the OpenGL applies to the GPU for a block of video RAM (a video RAM 401) in advance during initialization. In this case, the OpenGL may write the to-be-edited video frame in the float RGB format into the video RAM that is applied for in advance, in other words, into the video RAM 401 (step 5).

(Step 6) After successfully writing the to-be-edited video frame in the float RGB format into the video RAM that is applied for in advance, the OpenGL may return, to the APP, information indicating that the to-be-edited video frame in the float RGB format is successfully written into the video RAM that is applied for in advance. (Step 7) Then, the APP may send, to the OpenGL, an editing operation that is performed by a user and that is recorded in S202. An editing operation of adding a filter "LUT 4" shown in FIG. 1F is used as an example. The OpenGL may render the to-be-edited video frame by using a LUT filter. In S202, after detecting a user operation of using the filter "LUT 4", the APP may record the editing operation of using the filter "LUT 4". The editing operation is not limited to adding the LUT filter. This is not limited in this embodiment of this application.

Computational logic corresponding to different editing operations is preset in the OpenGL. The editing operation of using the filter "LUT 4" to render the video is used as an example. Computational logic corresponding to the editing operation is to set a gray value of each pixel in the video frame to 128 (the computational logic is an example). (Step 8) After receiving the editing operation delivered by the APP, the OpenGL may determine, based on the editing operation, the computational logic corresponding to the editing operation, and then, the OpenGL may deliver the computational logic to the GPU, to indicate the GPU to perform video frame computation corresponding to the editing operation.

(Step 9) After receiving the computational logic delivered by the OpenGL, the GPU may sequentially perform a computing operation indicated by the computational logic, and then, the GPU may obtain a processed video frame. For example, after receiving the computational logic of setting the gray value of each pixel in the video frame to 128, the GPU may set a gray value of a pixel in the to-be-processed video frame to 128. In this case, the processed video frame may have a dark gray display effect of the filter "LUT 4".

A processing process of setting the gray value of the video frame may be referred to as using LUT 4 to render the video frame. After completing rendering, the GPU may obtain an edited video frame. The edited video frame is a video frame having a visual effect of the LUT filter. A data format that is of the to-be-edited video frame and that exists before rendering is the float RGB format, and a data format that is of the video frame and that exists after rendering is the float RGB format.

In this embodiment of this application, in order that an edited video frame in the 10-bit YUV format can be output subsequently, after obtaining an edited video frame in the float RGB format, the OpenGL needs to convert an encoding format of the edited video frame and set a data format. The data format is a format of data describing one color channel (R, G, B, A) of one pixel.

In a video with a bit depth of 8 bits, a binary digit used to describe one color channel is 8 bits, namely, 1 byte. In a video of a bit depth 10 bits, a binary digit used to describe one color channel is 16 bits, namely, 2 bytes. Because the edited video is output still by using an existing read function (readpixel) for outputting an 8-bit video in the OpenGL, but the function readpixel only supports to output a color channel in a 1-byte format, in other words, output data is an 8-bit integer, the OpenGL may split, into two pieces of 1-byte data, 2-byte data describing one color channel after editing, so that the function readpixel is called to sequentially output the two pieces of 1-byte data, to output the 2-byte data.

It can be understood that the function readpixel actually and directly outputs a video frame whose each pixel is processed as above, instead of outputting one color channel of one pixel each time the function readpixel is called. In this embodiment of this application, one color channel of one pixel is used as an example to describe a process in which the function readpixel outputs the video frame.

Figure 6A:
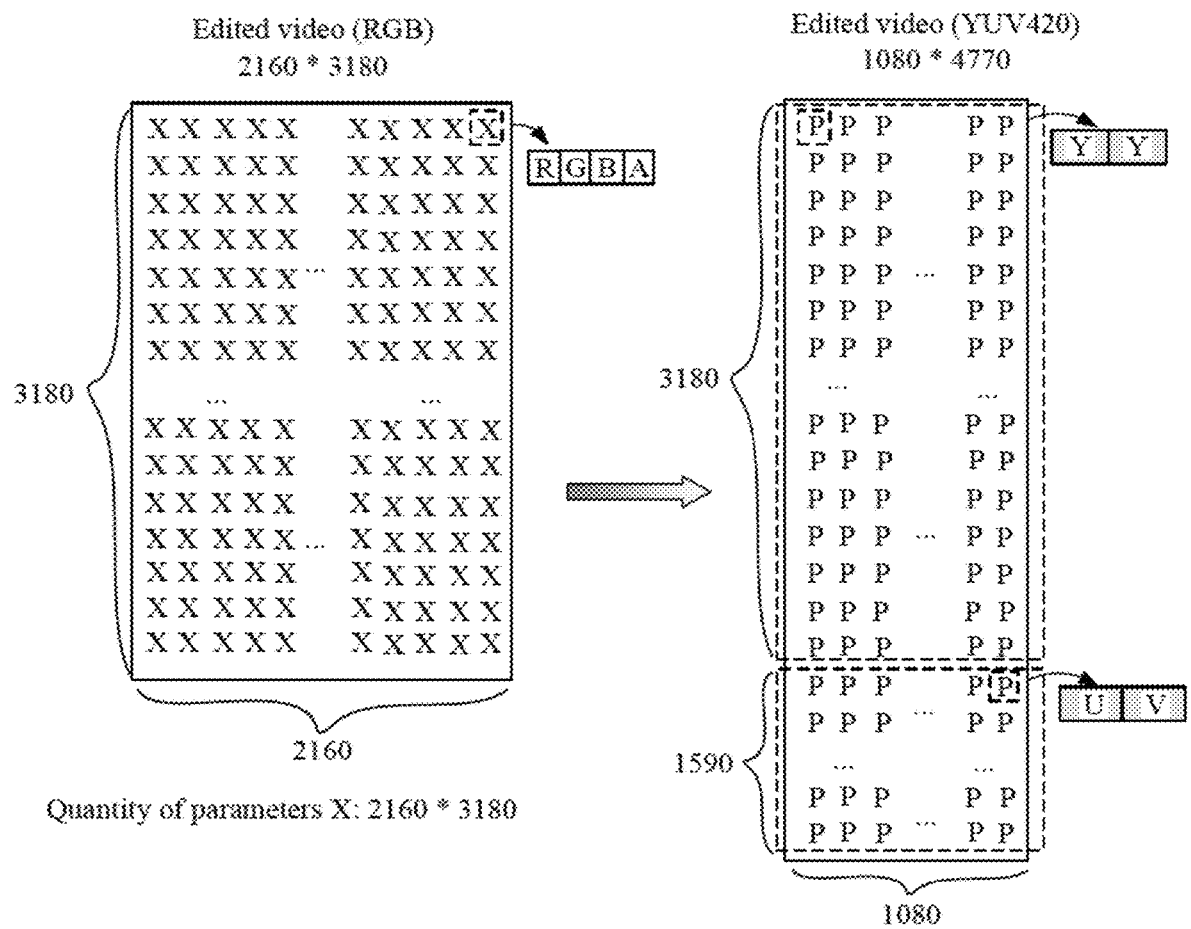
FIG. 6A is a schematic diagram in which an electronic device converts a color encoding format of a video frame according to an embodiment of this application.
Figure 6B:
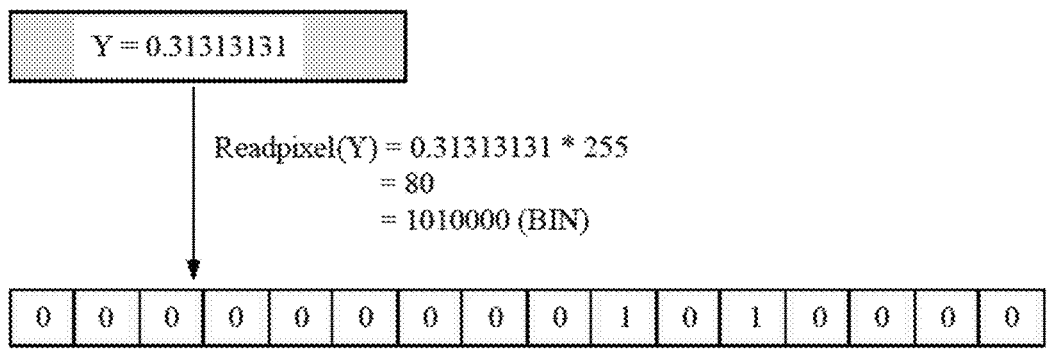
FIG. 6B and FIG. 6C are schematic diagrams in which an electronic device uses two floating-point numbers to replace one floating-point number, so that a GPU outputs a 10-bit video frame according to an embodiment of this application.
Figure 6B:
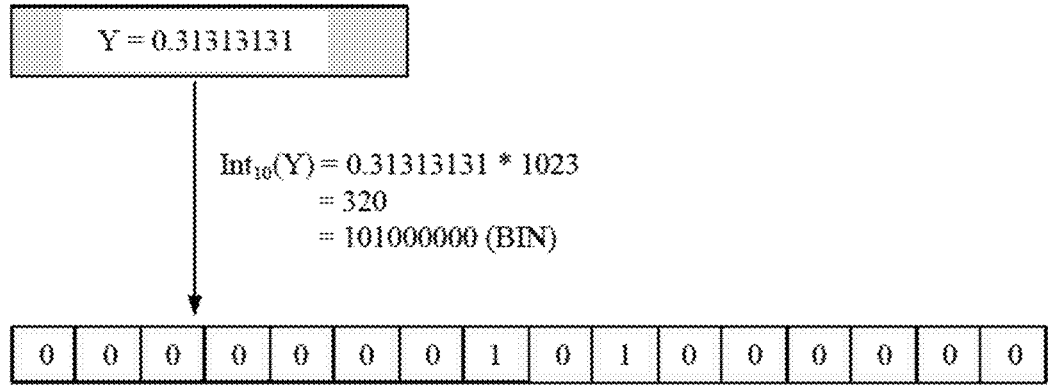
Figure 6C:
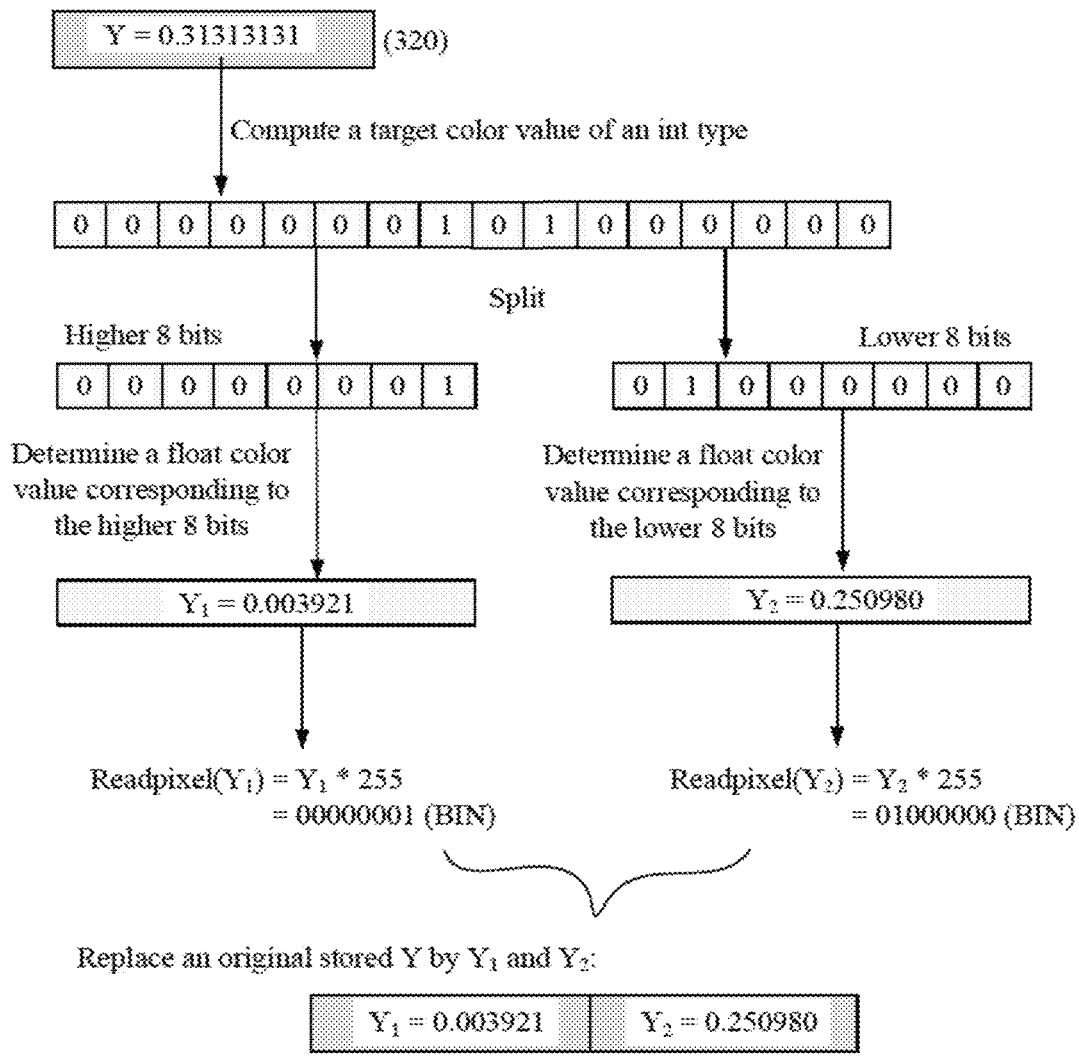

Specifically, FIG. 6A to FIG. 6C show an adjustment process. First, FIG. 6A shows an example of a process in which an OpenGL converts a video frame in an RGB format into a video frame in a YUV format.

First, as shown in a left video frame in FIG. 6A (an edited video frame in the RGB format), it is assumed that a size of the video frame is 2160*3180 (width*height). The size 2160*3180 of the video frame indicates that a quantity of parameters X is 2160*3180. One parameter X may represent one pixel, and one parameter X includes four color channels (R, G, B, A). Each color channel occupies an 8-bit binary (8-bit) storage unit. A value stored in each color channel is a value of the color channel (a color value). In this case, data stored in (R, G, B, A) is float data.

In a YUV encoding format, one parameter Y may represent luminance (Luminance or Luma), namely, a gray value that describes a pixel, and a group including a parameter U and a parameter V may represent chrominance (Chrominance or Chroma) of four pixels. In this embodiment of this application, the YUV encoding format used herein is specifically a YUV420 format. In the YUV420 format, the parameter Y is first recoded, and then the parameter U and the parameter V are recorded.

In this embodiment of this application, a conversion formula used for converting the RGB format to the YUV format is as follows:

$$\begin{bmatrix} Y \\ U \\ V \end{bmatrix} = \begin{bmatrix} 0.2627 & 0.678 & 0.0593 \\ -0.13963 & -0.36037 & 0.5 \\ 0.5 & -0.459786 & -0.040214 \end{bmatrix} \begin{bmatrix} R \\ G \\ B \end{bmatrix}$$

The conversion formula is not limited to the conversion formula. In another embodiment, a value of a transpose matrix may be different from the foregoing shown value.

A group (Y, U, V) may be computed based on one parameter X (R, G, B, A). Further, the OpenGL may combine the parameter U and the parameter V in four groups of (Y, U, V) into a group including the parameter U and the parameter V, and the including the parameter U and the parameter V is used to represent the parameter U and the parameter V in the four groups of (Y, U, V).

For example, it is assumed that there are four pixels, and the four pixels are respectively X1 (R1, G1, B1), X2 (R2, G2, B2), X3 (R3, G3, B3), and X4 (R4, G4, B4). X1 (R1, G1, B1) is input into the conversion formula to obtain (Y1, U1, V1). Similarly, (Y2, U2, V2), (Y3, U3, V3), and (Y4, U4, V4) may be obtained. Further, U=(U1+U2+U3+U4)/4, and V=(V1+V2+V3+V4)/4. Therefore, in the YUV420 format, YUV data values describing the four pixels are (Y1, U, V), (Y2, U, V), (Y3, U, V), and (Y4, U, V).

One pixel X (0.121212, 0.121212, 0.121212, 0.121212) in FIG. 6A is used as an example. Herein, in the pixel X, R=0.121212, G=0.121212, B=0.121212, and A=0.121212. Y=0.31313131 in the pixel may be obtained based on the conversion formula (the parameter U and the parameter V are not specifically computed herein).

As shown in FIG. 6A, an image frame in the YUV format is on the right, and one parameter P may represent a 32-bit storage unit provided by the four color channels (R, G, B, A). One parameter P may store two parameters Y or a group (U, V).

When one parameter P stores two parameters Y, the P corresponds to two original parameters X. When one parameter P stores a group (U, V), the parameter P corresponds to four original parameters X. Therefore, a quantity of parameters P for storing the parameter Y is a half of the quantity of parameters X, namely, 2160*3180/2, and a quantity of parameters P for storing (U, V) is one quarter of the quantity of parameters X, namely, 2160*3180/4. Therefore, a size of a video frame obtained after conversion becomes 1080*4770.

The OpenGL provides the function readpixel that outputs a pixel. When the function readpixel reads data, a float value in each color channel of the pixel is multiplied by 255, and a result is saved as an integer. For the video frame with the bit depth of 10 bits, a float stored in the color channel needs to be output after being multiplied by 1023. If the function readpixel provided by the OpenGL is directly used to output the parameter Y, precision of the parameter Y becomes lower. For example, as shown in FIG. 6B, an output of Y=0.31313131*255 is 80. Actually, the output of Y needs to be Y=0.31313131*1023=320. Therefore, the function readpixel cannot be directly used to read the video frame that is in the YUV format and that is obtained after conversion.

In this case, in this embodiment of this application, the OpenGL splits Y=0.31313131 into two floats. The function readpixel is used to read the two floating-point numbers based on an output of 8 bits, so that the two output 8-bit integral numbers are connected to indicate a result of Y=0.31313131*1023=320. FIG. 6C shows an example of the foregoing process.

Specifically, the OpenGL may first compute Y=0.31313131*1023=320 (1 0100 0000). In this case, the binary number is divided into "0000 0001" (higher 8 bits) and "0100 0000" (lower 8 bits) based on higher 8 bits and lower 8 bits. During division, zero padding may be performed when there are insufficient higher bits. The OpenGL may compute floats corresponding to the higher 8 bits and the lower 8 bits, and replace an original stored parameter Y with the computed floats corresponding to the higher 8 bits and the lower 8 bits.

The higher 8 bits "0000 0001" may be converted into one float (float 1): 0.003921 (1/255), and the lower 8 bits "0100 0000" may also be converted into one float (float 2): 0.250980 (64/255). In this case, the Open GL may call the function readpixel for two times, to respectively output the float 1 and the float 2. The function readpixel outputs the float 1 to obtain 0000 0001, and the function readpixel outputs the float 2 to obtain 0100 0000. 0000 0001 and 0100 0000 are directly combined, to obtain 0000 0001 0100 0000, in other words, to obtain Y=0.31313131*1023=320 that needs to be theoretically output.

Therefore, the OpenGL implements a function of restoring the edited video frame in the float RGB format to the video frame in the 10-bit YUV format for output.

When performing RGB-to-YUV conversion, the OpenGL further returns, based on a width and height of the video, a width and height that match a surface. Herein, the matched width and height are a width and height obtained after padding is performed based on an original width and height of the video. A reason is that a chip platform has a requirement for a width and height of a video in the 10-bit YUV format. A requirement is that a value of a width of the video frame needs to be supported to be exactly divided by 128, and a size of a height needs to be supported to be exactly divided by 32.

Figure 6D:
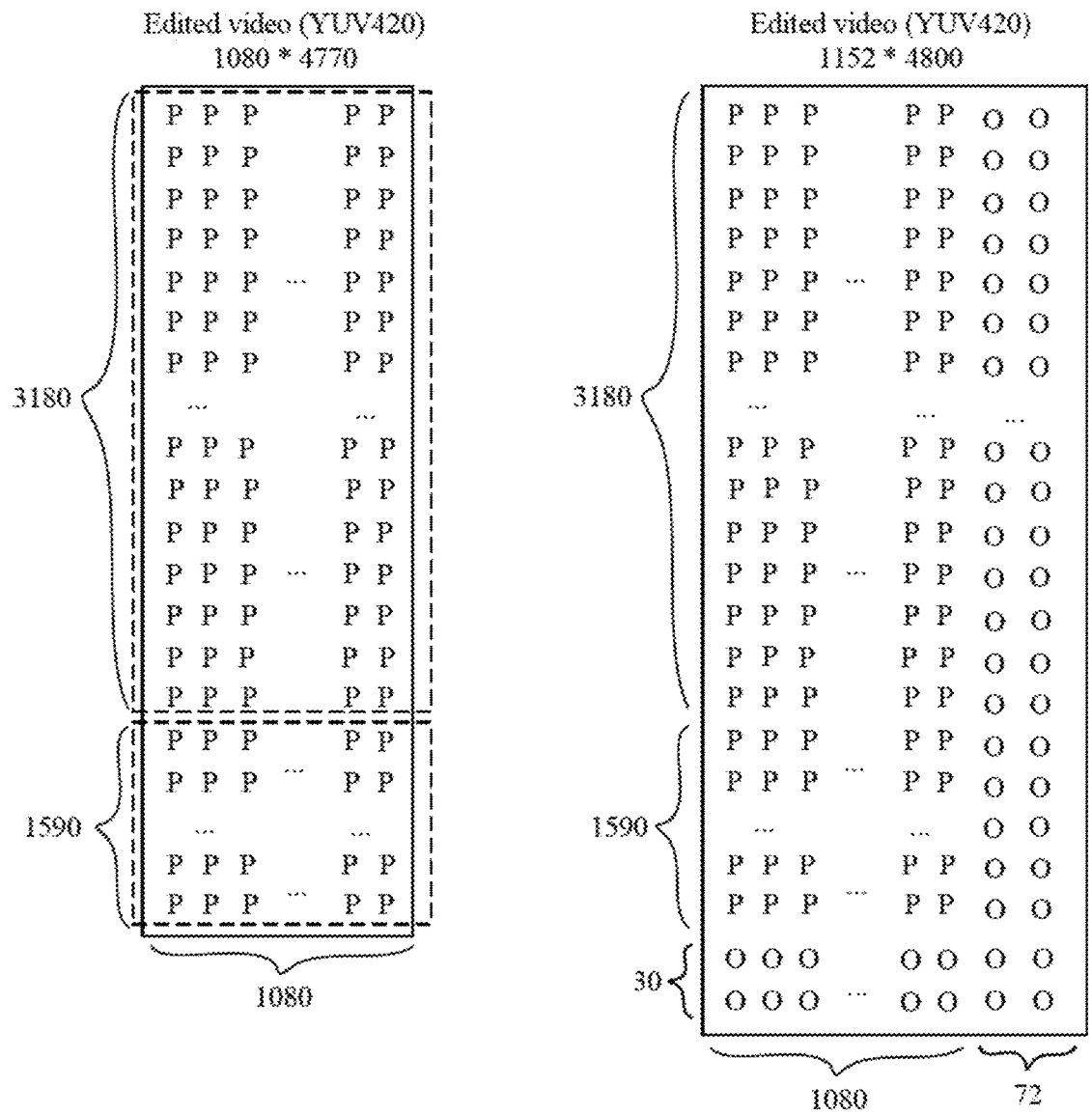
FIG. 6D is a schematic diagram in which an electronic device pads a video frame according to an embodiment of this application.

Referring to FIG. 6D, after the video frame in the RGB format is converted into the YUV format, a size of the video frame becomes 1080*4770. In this case, the width 1080 of the video frame is not exactly divided by 128, and 4770 cannot be exactly divided by 32. In this case, the OpenGL needs to recompute the size of the video frame, to meet the requirement of the chip platform. A width that is greater than 1080 and that can be exactly divided by 128 is 1152, and a height that is greater than 4770 and that can be exactly divided by 32 is 4800. In this case, the OpenGL adjusts a size of a video frame with an original size of 1080*4770 to 1152*4800. Herein, the width increases from original 1080 to 1152, and the height increases from original 4770 to 4800. An added pixel may be randomly padded. "O" in FIG. 6D may represent a randomly padded data point. 1152*4800 may be referred to as a matched width and height. Then, the OpenGL may return the matched width and height to the surface. Further, the surface may receive, based on the size of the video frame, the edited video frame fetched from the video RAM 401.

(Step 10) After converting the encoding format and setting the data format, the GPU may return, to the OpenGL, information indicating that processing is completed, in other words, rendering of the video frame is completed. In addition, the GPU may further return a video RAM address of the rendered video frame to the OpenGL. It can be understood that the video RAM address returned by the GPU herein may be an address of the video RAM 401 that receives the to-be-edited video frame, or may be an address of other video RAM space in the GPU. In other words, the video RAM space in which the GPU stores the rendered video frame may be a video RAM 401 that originally stores a to-be-processed video, or may be other video RAM space in the GPU.

(Step 11) Then, the OpenGL may return, to the APP, information indicating that processing is completed and the video RAM address for storing the rendered video frame. After receiving the returned information, the APP may obtain the rendered video frame from the video RAM address, and write the video frame into the surface applied for by the encoder, so that the encoder encodes the rendered video frame and outputs the edited video.

Specifically, first, (step 12) the APP may invoke the JNI. The JNI may include two parameters: the video RAM address and a surface address. The video RAM address may indicate specific storage space that is of the GPU and from which the JNI obtains the edited video frame, and the surface address may indicate specific storage space that is of a memory and in which the JNI stores the obtained edited video frame. For example, the APP may transmit a video RAM address A1 and a surface address A2 to the JNI. The video RAM address A1 is the address of the video RAM 401, and the surface address A2 is the address of the surface applied for by the encoder in FIG. 5A and FIG. 5B.

Optionally, the JNI may further include a bit depth parameter. The JNI may set, based on the bit depth parameter, a bit depth of a video frame that the surface supports to carry. For example, the bit depth parameter of the JNI may be set to 10 bits. In this case, the JNI may set, to 10 bits, the bit depth of the video frame that the surface supports to carry. Therefore, the surface may be configured to carry the video frame with the bit depth of 10 bits. In another embodiment, the JNI may alternatively not include the bit depth parameter. In this case, when receiving information indicating that the APP invokes the JNI, the JNI may set, to 10 bits by default, the bit depth of the video frame that the surface supports to carry, without a need to indicate the bit depth parameter.

(Step 13) In response to being invoked by the APP, the JNI may first set, to 10 bits, the bit depth of the video frame that the surface supports to carry, and set the color encoding format to the YUV format. In addition, the encoder may set, based on the color encoding format of the video frame that the surface supports to carry, a color encoding format of a video frame that the encoder supports to carry, referring to descriptions of (8) in FIG. 5A and FIG. 5B. Therefore, after setting the surface to the 10-bit YUV format, the encoder may set, to the YUV format, the color encoding format of the video frame that the encoder supports to carry. Therefore, the surface may carry the video frame in the 10-bit YUV format. Further, the encoder may encode the video frame in the 10-bit YUV format. Therefore, the encoder may identify a color value representing one color channel in a 10-bit (namely, 2 bytes) reading manner. It can be understood that after the bit depth of the surface is set to 10 bits, the surface may receive an 8-bit video frame output by the GPU.

(Step 14) After setting a format (the bit depth and the color encoding format) of the video frame that the surface supports to carry, the JNI may send, to the memory, a request for applying for a block of memory (denoted as a graphics buffer). In response to the request, the memory may allocate a block of memory space (namely, the graphics buffer) to the JNI. Subsequently, the memory may return a memory address of the graphics buffer to the JNI. Then, the JNI may use the graphics buffer to receive the edited video frame output by the GPU.

(Step 15) Then, the JNI may call the read function (readpixel) provided by the OpenGL. Inputting float data into the read function readpixel can output it as 8-bit integer For example, when a color value that is of one color channel of one pixel and that is stored in the GPU is 0.31313131, the function readpixel is called to output the color value of the color channel, to obtain an integral number described by using an 8-bit binary digit, namely, 01010000.

When the function readpixel is called, the JNI may transmit the video RAM address and the address of the graphics buffer to the OpenGL. In response to the request of the JNI for calling the function readpixel, the OpenGL may execute the function readpixel, to read the edited video frame from the storage space that is of the GPU and that is indicated by the video RAM address. (Step 16) Further, the video frame is written into the graphics buffer indicated by the address of the graphics buffer.

In this embodiment of this application, in consideration that the function readpixel cannot directly output a 10-bit integral number, after the video frame is rendered, the OpenGL further converts the data format of the rendered video frame stored in the GPU. Reference is made to descriptions of step 9. Details are not described herein. After the processing is performed, a 16-bit binary number output by calling the function readpixel for two times is a 10-bit integer corresponding to rendered float data, to implement a capability of outputting the video frame with the bit depth of 10 bits.

(Step 17) The JNI may input, into the surface indicated by the address of the surface, the edit video frame buffered in the graphics buffer. Therefore, the encoder may encode the edited video stored in the surface, to output the edited video to the APP. In some embodiments, the JNI may alternatively not apply for the graphics buffer, but instead, directly send the fetched edited video to the surface.

(Step 18) After the surface carries the edited video frame, the encoder may encode the edited video frame (the 10-bit YUV format) carried in the surface, and encapsulate frames of edited video frames into the video into the 10-bit YUV format, namely, the edited video. (Step 19) Then, the encoder may return the encapsulated video in the 10-bit YUV format to the video editing application.

After receiving the edited video sent by the encoder, the video editing application may display or save the edited video. Therefore, the electronic device 100 completes a process of editing and saving the 10-bit HDR video. In the editing scenarios in FIG. 1A to FIG. 1K, the to-be-edited video may be a LOG video, and the editing operation may be adding the LUT filter. Therefore, the edited video may be referred to as an HDR video.

Figure 7A:
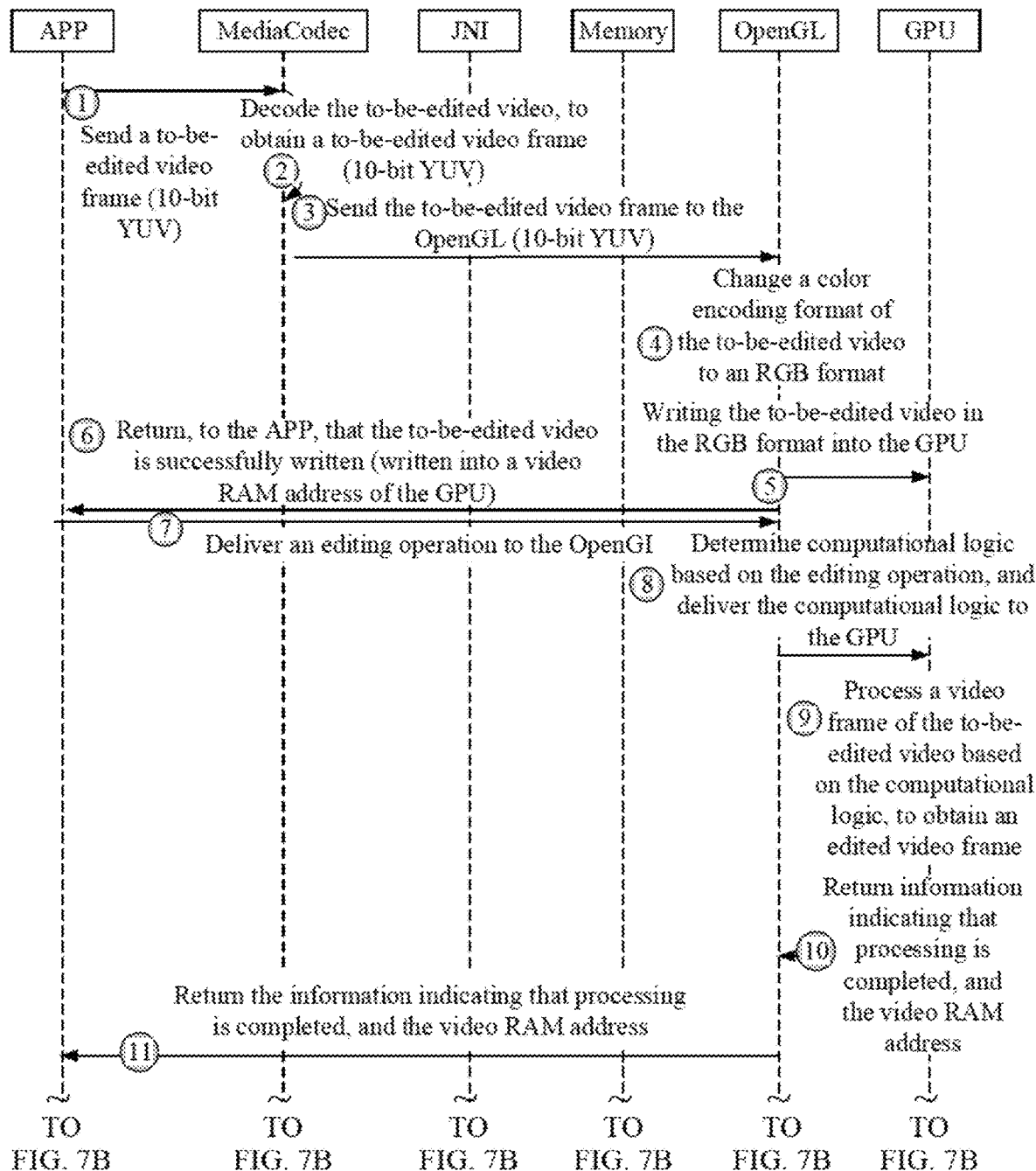
FIG. 7A and FIG. 7B are a flowchart in which an electronic device edits a video according to an embodiment of this application.
Figure 7B:
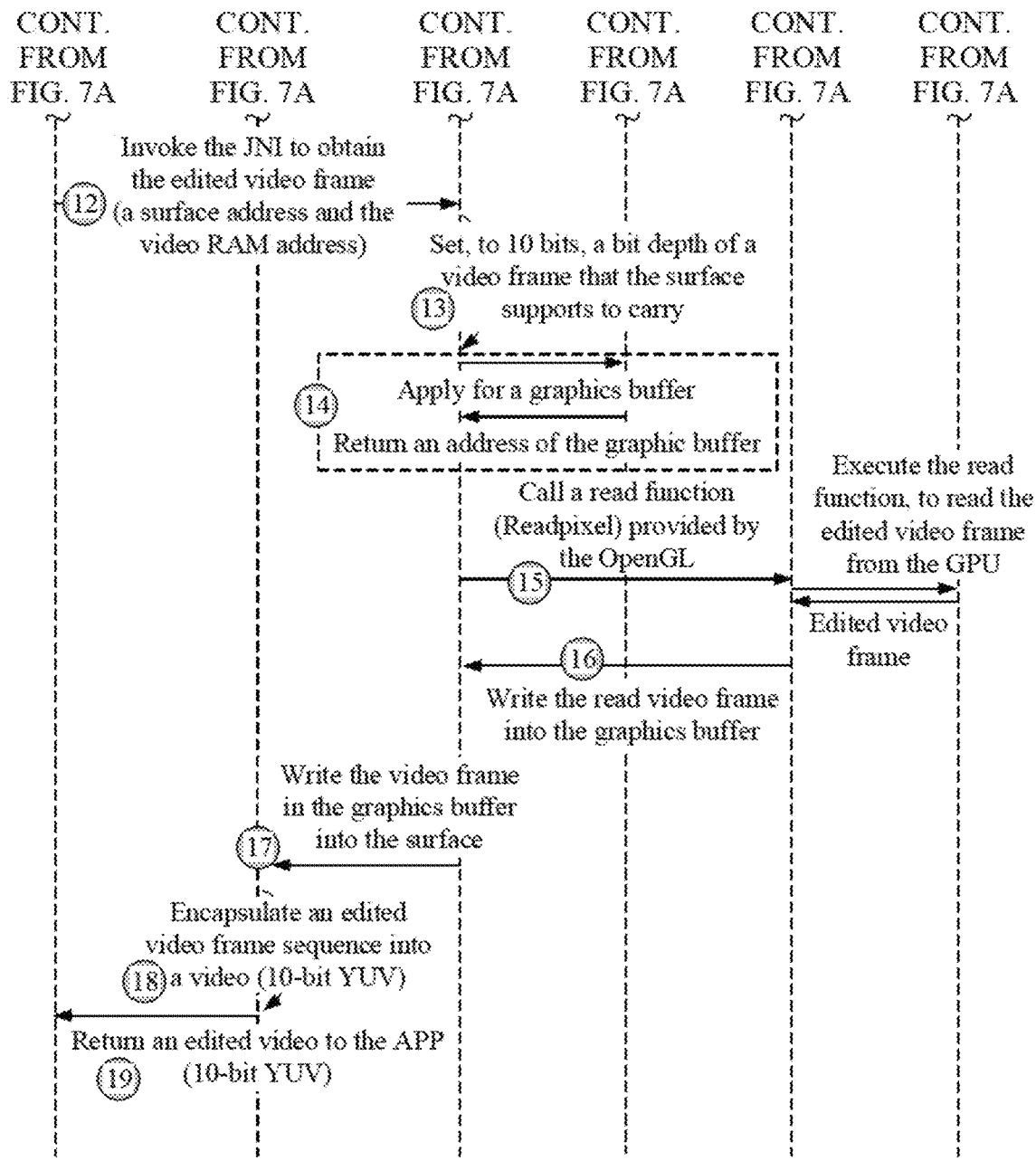

FIG. 7A and FIG. 7B are an example flowchart in which a video editing application (APP) sends a to-be-edited video to a decoder and an encoder returns an edited video. Data interaction between modules in FIG. 7A and FIG. 7B (step 1 to step 19) corresponds to steps 1 to 19 in FIG. 4. Details are not described herein.

Figure 8:
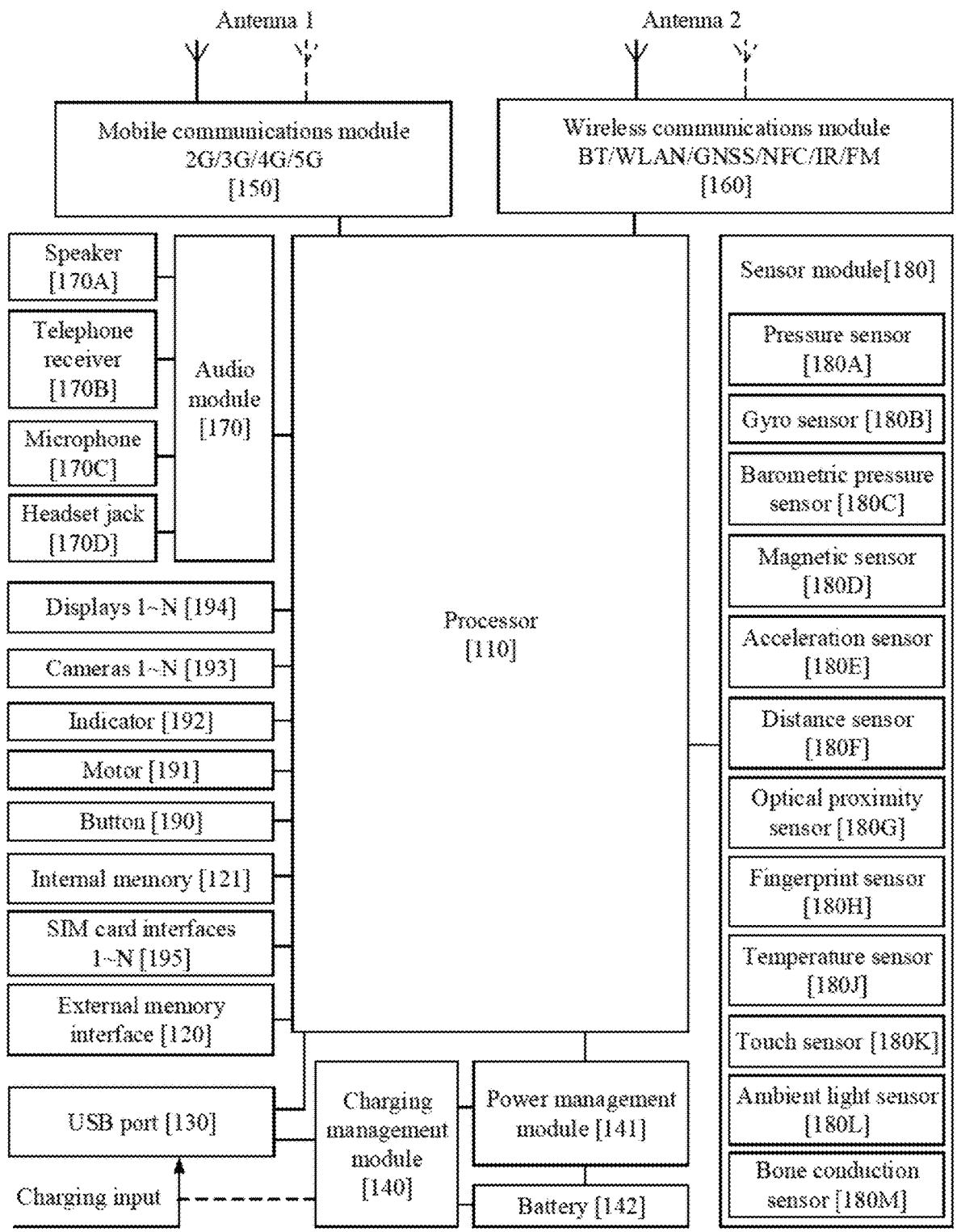
FIG. 8 is a diagram of a hardware structure of an electronic device according to an embodiment of this application.

FIG. 8 is an example schematic diagram of a hardware structure of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or components are arranged in different manners. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural processing unit (neural-network processing unit, NPU). Different processing units may be independent components, or may be integrated into one or more processors.

The controller may generate an operation control signal based on instruction operation code and a time sequence signal, and complete control of instruction fetching and instruction execution.

A memory may be disposed in the processor 110, and is configured to store instructions and data. In some embodiments, the memory in the processor 110 is a cache. The memory may store instructions or data just used or cyclically used by the processor 110. If the processor 110 needs to use the instructions or data again, the instructions or data may be directly called from the memory. In this case, repeated access is avoided, a waiting time period of the processor 110 is reduced, and efficiency of a system is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (derial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, to sample, quantize, and encode an analog signal. In some embodiments, the audio module 170 and the wireless communications module 160 may be coupled through a PCM bus interface. In some embodiments, the audio module 170 may transfer an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a bi-directional communications bus. The UART interface converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 and a peripheral component such as the display 194 or the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface can be configured by using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, or the like. The GPIO interface may be further configured as an I2C interface, an I2S interface, a UART interface, an MIPI interface, or the like.

The USB interface 130 is an interface that meets a USB standard specification, and may be specifically a mini USB interface, a micro USB interface, a USB Type-C interface, or the like. The USB interface 130 may be configured to be connected to the charger to charge the electronic device 100, or may be configured to transmit data between the electronic device 100 and a peripheral device. The USB interface 130 may also be configured to be connected to a headset, to play audio by using the headset. The interface may be further configured to be connected to another electronic device, for example, an AR device.

It may be understood that an interface connection relationship between modules illustrated in this embodiment of the present invention is merely an example for description, and does not constitute a limitation on a structure of the electronic device 100. In some other embodiments of this application, different interface connection manners in the foregoing embodiments or a combination of a plurality of interface connection manners may alternatively be used for the electronic device 100.

The charging management module 140 is configured to receive charging input from a charger. The charger may be a wireless charger, or may be a wired charger. In some wired charging embodiments, the charging management module 140 may receive a charging input of a wired charger through the USB port 130. In some wireless charging embodiments, the charging management module 140 may receive a wireless charging input by using a wireless charging coil of the electronic device 100. While charging the battery 142, the charging management module 140 may further supply power to the electronic device by using the power management module 141.

The power management module 141 is configured to be connected to the battery 142, the charging management module 140, and the processor 110. The power management module 141 receives input of the battery 142 and/or the charging management module 140, and supplies power to the processor 110, the internal memory 121, the display 194, the camera 193, the wireless communications module 160, and the like. The power management module 141 may be further configured to monitor a parameter such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, or the like.

The antenna 1 and the antenna 2 are configured to transmit and receive electromagnetic wave signals. Each antenna in the electronic device 100 may be configured to cover one or more communication frequency bands. Different antennas may also be multiplexed to improve antenna utilization. For example, the antenna 1 may be multiplexed as a diversity antenna of the wireless local area network. In some other embodiments, the antenna may be used in combination with a tuning switch.

The mobile communications module 150 may provide a solution to wireless communication including 2G/3G/4G/5G, and the like applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal obtained after modulation by the modem processor, and convert the signal into an electromagnetic wave through the antenna 1 for radiation. In some embodiments, at least some functional modules of the mobile communication module 150 may be disposed in the processor 110. In some embodiments, the at least some functional modules of the mobile communications module 150 and at least some functional modules of the processor 110 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low-frequency baseband signal. Then, the demodulator transmits the low-frequency baseband signal that is obtained through demodulation to the baseband processor for processing. The low-frequency baseband signal is processed by the baseband processor and then transmitted to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communications module 160 may provide a solution to wireless communication including a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like that is applied to the electronic device 100. The wireless communications module 160 may be one or more devices that integrate at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric computation, and is configured to perform graphics rendering. The processor 110 may include one or more GPUs, and execute program instructions to generate or change display information.

In this embodiment of this application, the electronic device 100 may display the user interfaces shown in FIG. 1A to FIG. 1K by using the GPU and the display 194. In particular, in response to an operation that a user edits a video, a process in which the electronic device 100 edits the video by using an OpenGL and saves the edited video as a 10-bit video also depends on the GPU and the display 194.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a miniLED, a microLED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement the photographing function by using the ISP, the camera 193, the video codec, the GPU, the display 194, the application processor, or the like.

In this embodiment of this application, an edited video with a bit depth of 10 bits may be obtained by the electronic device 100 from another electronic device through the wireless communications function, or may be captured by the electronic device 100 through the ISP, the camera 193, the video codec, the GPU, and the display 194.

The ISP is configured to process data fed back by the camera 193. For example, during photographing, a shutter is pressed, light is transmitted to a photosensitive element of the camera by using a lens, an optical signal is converted into an electrical signal, and the photosensitive element of the camera transfers the electrical signal to the ISP for processing, so that the electrical signal is converted into an image visible to a naked eye. The ISP may further perform algorithm optimization on noise, brightness, and a skin color of the image. The ISP may further optimize a parameter such as exposure and a color temperature of a photographing scenario. In some embodiments, the ISP may be disposed in the camera 193.

The camera 193 is configured to capture a still image or a video. An optical image of an object is generated by using the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of RGB, YUV, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on energy of the frequency.

The video codec is configured to compress or decompress a digital video. The electronic device 100 may support one or more video codecs. Therefore, the electronic device 100 may play or record videos in a plurality of encoding formats, such as moving picture experts group (moving picture experts group, MPEG)-1, MPEG-2, MPEG-3, and MPEG-4.

The NPU is a neural-network (neural-network, NN) computing processor. By referring to a structure of a biological neural network, such as a transfer mode between human brain neurons, the NPU quickly processes input information, and may further perform continuous self-learning. The NPU may be used to implement an application such as intelligent cognition of the electronic device 100, for example, image recognition, facial recognition, voice recognition, and text understanding.

The internal memory 121 may include one or more random access memories (random access memory, RAM) and one or more nonvolatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is usually referred to as DDR5 SDRAM), and the like. The nonvolatile memory may include a magnetic disk storage device and a flash memory (flash memory).

The flash memory may include NOR FLASH, NAND FLASH, 3D NAND FLASH, and the like based on an operating principle; may include a single-level cell (single-level cell, SLC), a multi-level cell (multi-level cell, MLC), a triple-level cell (triple-level cell, TLC), a quad-level cell (quad-level cell, QLC), and the like based on an order of a level of a storage unit; and may include a universal flash storage (English: universal flash storage, UFS), an embedded multimedia card (embedded multimedia Card, eMMC), and the like based on a storage specification.

The random access memory may be directly read and written by the processor 110, and may be configured to store an executable program (for example, a machine instruction) of an operating system or another running program, and may be further configured to store data of a user and data of an application.

The nonvolatile memory may store an executable program, data of a user and an application, and the like, and may be loaded into the random access memory in advance, so that the processor 110 directly performs reading and writing.

In this embodiment of this application, the internal memory 121 may support the electronic device 100 to apply to the memory for a surface and a conveyor bufferqueue.

The external memory interface 120 may be configured to connect to an external nonvolatile memory, to expand a storage capacity of the electronic device 100. The external nonvolatile memory card communicates with the processor 110 by using the external memory interface 120, to implement a data storage function. For example, music, video, and other files are stored in the external nonvolatile memory. In this embodiment of this application, the electronic device 100 may collect a sound through the microphone 170C when capturing the 10-bit video. In a video playing process, the speaker 170A or a speaker connected to the headset jack 170D may support to play audio in the video.

The electronic device 100 may implement an audio function by using the audio module 170, the speaker 170A, the telephone receiver 170B, the microphone 170C, the headset jack 170D, the application processor, or the like, for example, music playing or recording.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some functional modules of the audio module 170 may be disposed in the processor 110.

The speaker 170A, also referred to as "horn", is configured to convert an audio electrical signal into a sound signal. The electronic device 100 may be used to listen to music or answer a call in a hands-free mode through the speaker 170A. The telephone receiver 170B, also referred to as an "earpiece", is configured to convert an audio electrical signal into a sound signal. When a call is answered or audio information is listened to by using the electronic device 100, the telephone receiver 170B may be put close to a human ear to listen to a voice. The microphone 170C, also referred to as a "mike" or a "mic", is configured to convert a sound signal into an electrical signal. When making a call or sending audio information, the user may make a sound near the microphone 170C through the mouth of the user, to enter a sound signal into the microphone 170C. The electronic device 100 may be provided with at least one microphone 170C. In some other embodiments, the electronic device 100 may be provided with two microphones 170C, to implement a noise reduction function in addition to collecting a sound signal. In some other embodiments, the electronic device 100 may be further provided with three, four, or more microphones 170C, to collect a sound signal, reduce noise, identify a sound source, implement a directional recording function, and the like.

The headset jack 170D is configured to be connected to a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed on a same touch location but have different touch operation intensity may correspond to different operation instructions. For example, when a touch operation whose touch operation intensity is less than a first pressure threshold is performed an SMS message application icon, an instruction for viewing an SMS message is executed. For example, when a touch operation whose touch operation intensity is greater than or equal to the first pressure threshold is performed on the SMS message application icon, an instruction for creating a new SMS message is executed.

The gyro sensor 180B may be configured to determine a moving posture of the electronic device 100. In some embodiments, an angular velocity of the electronic device 100 around three axes (to be specific, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion sensing game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or an opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power storing. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G, to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when a temperature reported by the temperature sensor 180J exceeds a threshold, the electronic device 100 lowers performance of a processor located near the temperature sensor 180J, to reduce power consumption for thermal protection. In some other embodiments, when the temperature is lower than another threshold, the electronic device 100 heats the battery 142, to prevent the electronic device 100 from being shut down abnormally due to a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch device". The touch sensor 180K may be disposed on the display screen 194. The touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a touch event type. A visual output related to the touch operation may be provided by using the display 194. In some other embodiments, the touch sensor 180K may also be disposed on a surface of the electronic device 100, and is located on a location different from that of the display 194.

In this embodiment of this application, the electronic device 100 detects whether a user operation performed on the display 194 of the electronic device 100 may be performed by using the touch sensor 180K. After the touch sensor 180K detects the user operation, the electronic device 100 may perform an operation indicated by the user operation, and then edit and store the 10-bit video.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse, to receive a blood pressure beating signal. In some embodiments, the bone conduction sensor 180M may alternatively be disposed in a headset to be combined into a bone conduction headset. The audio module 170 may obtain a speech signal through parsing based on the vibration signal that is obtained by the bone conduction sensor 180M from bone mass vibration by the voice part, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, message receiving, an alarm clock, and a game) may also correspond to different vibration feedback effects. A touch vibration feedback effect may further be customized.

The indicator 192 may be an indicator light, and may be used to indicate a charging status or a power change, or may be used to indicate a message, a missed call, a notification, or the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be inserted into a same SIM card interface 195 at a same time. The plurality of cards may be of a same type or different types. The SIM card interface 195 may be compatible with different types of SIM cards. The SIM card interface 195 may also be compatible with an external memory card. The electronic device 100 interacts with a network by using the SIM card, to implement functions such as conversation and data communication. In some embodiments, an eSIM, namely, an embedded SIM card, is used for the electronic device 100. The eSIM card may be embedded into the electronic device 100, and cannot be separated from the electronic device 100.

By implementing a video editing method provided in an embodiment of this application, the electronic device 100 may provide the user with a capability to edit a video (HDR10, HLG, a LOG gray film) with the bit depth of 10 bits, and save the edited video as a video with the bit depth of 10 bits. Therefore, the electronic device 100 not only meets a requirement of the user for editing of a 10-bit video, but also ensures that a saved edited video is still the 10-bit video, without reducing quality of the edited video.

In embodiments of this application:

A video selected by a user for editing in FIG. 1C may be referred to as a first video, and a saved edited video in FIG. 1K may be referred to as a second video. Any frame in the first video may be referred to as a first video frame, and a video frame obtained after processing in step 4 to step 17 in FIG. 4 is performed on the first video frame may be referred to as a second video frame.

An operation that the user taps a Save control in FIG. 1G may be referred to as a first editing operation, and an operation that the user selects a LUT filter (and/or cutting, and/or adding music) in FIG. 1D to FIG. 1F, or the like may be referred to as a second editing operation.

As shown in FIG. 4, in step 1 to step 3, a color value of any color channel of any pixel in the video selected by the user for editing may be referred to as a first color value (a 10-bit integer). In step 4, after receiving a to-be-edited video frame sent by an encoder, the OpenGL normalizes the video frame, to obtain a color value of one color channel. The color value may be referred to as a seventh color value. In step 9, a color value obtained after the seventh color value is processed by using an editing operation selected by the user is referred to as a second color value, for example, Y=0.313131 in FIG. 6B. Two floating-point numbers obtained by splitting the second color value into higher 8 bits and lower 8 bits based on a corresponding 10-bit integer may be referred to as two (N=2) third color values, for example, Y1=0.003921 and Y2=0.250980 in FIG. 6C. A second color value represented by an integer corresponding to the second color value may be referred to as a sixth color value, for example, 0000000101000000 corresponding to Y=0.313131. That 101000000 is split into 00000001 and 01000000 may be referred to as follows: The sixth color value is split into N pieces of integral data with a second bit depth in a unit of the second bit depth. Floating-point data corresponding to the two pieces of integral data with the second bit depth is two third color values. In step 15, when the OpenGL executes a function readpixel( ) to output two floating-point numbers stored in a GPU, integral numbers corresponding to the two floating-point numbers may be referred to as two (N=2) fifth color values. In step 17, when a surface carries the two fifth color values by using 10 bits, integral data formed by combining the two fifth color values may be referred to as a fourth color value. In other words, 00000001 and 01000000 are recombined into 0000000101000000.

The surface may be referred to as a first memory, and a graphics buffer may be referred to as a second memory.

A term "user interface (user interface, UI)" in the specification, claims, and accompanying drawings of this application is a medium interface for interaction and information exchange between a user and an application or an operating system, and implements conversion between an internal form of information and a form acceptable to the user. A user interface of the application is source code written in a specific computer language such as java or an extensible markup language (extensible markup language, XML). The source code of the interface is parsed and rendered on a terminal device, and finally is presented as user-identifiable content, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and a text. An attribute and content of the control in the interface are defined by using a tag or a node. For example, the control included in the interface is defined in the XML by using a node such as <Textview>, <ImgView>, or <Video View>. One node corresponds to one control or attribute in the interface. After being parsed and rendered, the node is displayed as user-visible content. In addition, interfaces of many applications such as a hybrid application (hybrid application) usually further include a web page. The web page, also referred to as a page, may be understood as a special control embedded in an application interface. The web page is source code written in a specific computer language, for example, a hypertext markup language (hypertext markup language, GTML), a cascading style sheet (cascading style sheets, CSS), or a javascript (JavaScript, JS). A source code of the web page may be loaded and displayed as user-identifiable content by a browser or a web page display component with a function similar to that of the browser. Specific content included in the web page is also defined by using a tag or a node in the source code of the web page. For example, an element and an attribute of the web page are defined in the GTML by using <p>, <img>, <video>, and <canvas>.

The user interface is usually in a representation form of a graphical user interface (graphic user interface, GUI), and the graphical user interface is a user interface that is related to a computer operation and that is displayed in a graphical manner. The user interface may be an interface element such as an icon, a window, or a control displayed on a display of the electronic device. Controls may include visual interface elements such as an icon, a button, a menu, a tab, a text box, a dialog box, a status bar, a navigation bar, or a widget.

The singular expressions "one", "one type of", "the", "the foregoing", and "this" used in this specification and the appended claims of this application are also intended to include plural forms, unless otherwise specified in the context clearly. It should also be understood that, the term "and/or" used in this application indicates and includes any one or all of possible combinations of one or more listed items. As used in embodiments, depending on the context, the term "when" can be interpreted as "if . . . ", "after . . . ", "in response to determining that . . . ", or "in response to detecting that . . . ". Similarly, depending on the context, the phrase "when it is determined that . . . " or "if it is detected that . . . (a stated condition or event)" can be interpreted as "if it is determined that . . . ", "in response to determining that . . . ", "when it is detected that . . . (the stated condition or event)", or "in response to detecting that . . . (the stated condition or event)".

All or some embodiments may be implemented by software, hardware, or a combination thereof. When software is used to implement embodiments, all or some embodiments may be implemented in a form of a computer program product. The computer program product includes one or more computer program instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some procedures of the methods in embodiments may be implemented by a computer program instructing related hardware. The program may be stored in a computer-readable storage medium. When the program is executed, the processes in the method embodiments are performed. The storage medium includes any medium that can store program code, such as a ROM, a random storage memory RAM, a magnetic disk, or an optical disc.

What is claimed is:

1. A video editing method, applied to an electronic device, wherein the method comprises:
    detecting a first operation performed on a first video, wherein a color value of a color channel of a pixel in a first video frame of the first video is a first color value, a bit depth of the first color value is a first bit depth, and the first video frame is any video frame of the first video;
    creating an encoder, wherein the encoder is configured to encode a video frame in the first bit depth;
    sending, by the encoder, the first video frame to an open graphics library (OpenGL);
    generating, by the OpenGL, a second color value based on the first color value;
    invoking, by the OpenGL, a graphics processing unit (GPU) to process the first video frame;
    generating, by the GPU, N third color values based on the second color value, wherein a bit depth of the N third color values is a second bit depth, the second bit depth is less than the first bit depth, and N is a positive integer greater than 1;

writing, by the GPU, the N third color values into the first memory, to obtain N fifth color values, and a bit depth of a video frame carried in the first memory is the first bit depth;

obtaining, by the encoder, a fourth color value based on the N fifth color values;

generating, by the encoder, a second video frame based on the fourth color value; and generating, by the encoder, a second video based on the second video frame.

2. The method according to claim 1, wherein the generating N third color values based on the second color value comprises:

determining, by the GPU, a sixth color value corresponding to the second color value, wherein a bit depth of the sixth color value is the first bit depth, and the sixth color value is integral data;

splitting, by the GPU, the sixth color value into N pieces of integral data with the second bit depth in a unit of the second bit depth; and determining, by the GPU, the N third color values based on the N pieces of integral data with the second bit depth.

3. The method according to claim 2, wherein the encoder obtaining a fourth color value based on the N fifth color values comprises:

reading, by the encoder, the N fifth color values from the first memory based on the first bit depth, to obtain the fourth color value.

4. The method according to claim 3, wherein before the writing, by the GPU, the N third color values into the first memory, the method further comprises:

setting, to the first bit depth, a bit depth of a video frame carried in the first memory.

5. The method according to claim 4, wherein the electronic device comprises a java native interface (JNI), and the setting, to the first bit depth, a bit depth of a video frame carried in the first memory comprises:

setting, by the JNI to the first bit depth, the bit depth of the video frame carried in the first memory.

6. The method according to claim 5, wherein the writing, by the GPU, the N third color values into the first memory comprises:

sending, by the JNI to the GPU, a request for obtaining the N third color values;

receiving, by the JNI, the N third color values sent by the GPU; and writing, by the JNI, the N third color values into the first memory.

7. The method according to claim 6, wherein the generating a second color value based on the first color value comprises:

normalizing, by the OpenGL, the first color value, and determining a seventh color value, wherein the seventh color value is floating-point data;

determining, by the OpenGL, computational logic of a second editing operation; and processing, by the OpenGL, the seventh color value based on the computational logic, to obtain the second color value.

8. The method according to claim 7, wherein the second editing operation comprises one or more of an editing operation of changing a quantity of video frames, an editing operation of changing a quantity of pixels in a video frame, and an editing operation of changing a color value of a pixel.

9. The method according to claim 8, wherein the electronic device comprises an editing application, and the determining, by the OpenGL, computational logic of a second editing operation comprises:

obtaining, by the OpenGL, the second editing operation by using the editing application; and determining, by the OpenGL, the computational logic corresponding to the second editing operation based on the second editing operation.

10. The method according to claim 9, wherein the electronic device comprises a decoder, and the detecting a first editing operation performed on a first video is: detecting, by the editing application, the first editing operation performed on the first video; and after the detecting a first editing operation performed on a first video, the method further comprises:

sending, by the editing application, the first video to the decoder; and decoding, by the decoder, the first video into M original video frames in response to receiving the first video, wherein the first video frame is any one of the M original video frames, and M is a positive integer greater than 1.

11. The method according to claim 1, wherein N is equal to 2.

12. The method according to claim 1, wherein the first bit depth is 10 bits, and the second bit depth is 8 bits.

13. The method according to claim 2, wherein the splitting the sixth color value into N pieces of integral data with the second bit depth in a unit of the second bit depth comprises:

when the first bit depth is a positive integer multiple of the second bit depth, N is the positive integer; and when the first bit depth cannot be exactly divided by the second bit depth, N is a quotient obtained by rounding up a result obtained by dividing the first bit depth by the second bit depth.

14. The method according to claim 6, wherein the electronic device further comprises a second memory, the request for obtaining the N third color values carries an address of the second memory, the second memory is a memory that is applied for by the JNI and that is used to store data, and the method further comprises:

writing, by the GPU, the N third color values into the second memory in response to receiving the request for obtaining the N third color values;

the receiving, by the JNI, the N third color values sent by the GPU comprises: receiving, by the second memory of the JNI, the N third color values sent by the GPU; and the writing, by the JNI, the N third color values into the first memory is: writing, by the JNI into the first memory, the N third color values stored in the second memory.

15. The method according to claim 14, wherein the electronic device comprises an open graphics library OpenGL;

the sending, by the JNI to the GPU, a request for obtaining the N third color values comprises: sending, by the JNI to the OpenGL, a first request for obtaining the N third color values; and sending, by the OpenGL to the GPU, a second request for obtaining the N third color values; and the writing, by the GPU, the N third color values into the second memory in response to receiving the request for obtaining the N third color values is: sending, by the GPU, the N third color values to the OpenGL in response to the second request; and writing, by the OpenGL, the N third color values into the second memory.

16. The method according to claim 7, wherein after the decoding, by the decoder, the first video into M original video frames, the method further comprises: sending, by the decoder, the M original video frames to the OpenGL; and before the determining, by the OpenGL, computational logic of a second editing operation, the method further comprises:

setting, by the OpenGL, a color encoding format of the first video frame to an RGB color format.

17. The method according to claim 7, wherein the first video comprises one of a high dynamic range (HDR) video and a LOG video.

18. The method according to claim 17, wherein
when the second editing operation is the editing operation of changing a quantity of video frames and/or the editing operation of changing a quantity of pixels in a video frame, the second video is an HDR video, and the second video is an HDR video; or the second video is a LOG video, and the second video is a LOG video; and
when the second editing operation is the editing operation of changing a color value of a pixel, the second video is a LOG video, and the second video is an HDR video.

19. An electronic device, comprising one or more processors and one or more memories, wherein the one or more memories are coupled to the one or more processors, the one or more memories are configured to store computer program code, the computer program code comprises computer instructions, and when the one or more processors execute the computer instructions, causing the electronic device to perform the following operations:
detecting a first operation performed on a first video, wherein a color value of a color channel of a pixel in a first video frame of the first video is a first color value, a bit depth of the first color value is a first bit depth, and the first video frame is any video frame of the first video;
creating an encoder, wherein the encoder configured to encode a video frame in the first bit depth;
sending, by the encoder, the first video frame to an open graphics library (OpenGL);
generating, by the OpenGL, a second color value based on the first color value;
invoking, by the OpenGL, a graphics processing unit GPU to process the first video frame;
generating, by the GPU, N third color values based on the second color value, wherein a bit depth of the N third color values is a second bit depth, the second bit depth is less than the first bit depth, and N is a positive integer greater than 1;
writing, by the GPU, the N third color values into the first memory, to obtain N fifth color values, and a bit depth of a video frame carried in the first memory is the first bit depth;
obtaining, by the encoder, a fourth color value based on the N fifth color values;
generating, by the encoder, a second video frame based on the fourth color value; and
generating, by the encoder, a second video based on the second video frame.

20. A non-transitory computer-readable storage medium, comprising instructions, wherein when the instructions run on an electronic device, causing the electronic device to perform the following operations:
detecting a first operation performed on a first video, wherein a color value of a color channel of a pixel in a first video frame of the first video is a first color value, a bit depth of the first color value is a first bit depth, and the first video frame is any video frame of the first video;
creating an encoder, wherein the encoder is configured to encode a video frame in the first bit depth;
sending, by the encoder, the first video frame to OpenGL;
generating, by the OpenGL, a second color value based on the first color value;
invoking, by the OpenGL, a graphics processing unit (GPU) to process the first video frame;
generating, by the GPU, N third color values based on the second color value, wherein a bit depth of the N third color values is a second bit depth, the second bit depth is less than the first bit depth, and N is a positive integer greater than 1;
writing, by the GPU, the N third color values into the first memory, to obtain N fifth color values, and a bit depth of a video frame carried in the first memory is the first bit depth;
obtaining, by the encoder, a fourth color value based on the N fifth color values;
generating, by the encoder, a second video frame based on the fourth color value; and
generating, by the encoder, a second video based on the second video frame.

* * * * *